United States Patent
Stein et al.

(10) Patent No.: US 7,335,247 B2
(45) Date of Patent: Feb. 26, 2008

(54) ION TRANSPORT MEMBRANE MODULE AND VESSEL SYSTEM

(75) Inventors: VanEric Edward Stein, Allentown, PA (US); Michael Francis Carolan, Allentown, PA (US); Christopher M. Chen, Allentown, PA (US); Phillip Andrew Armstrong, Orefield, PA (US); Harold W. Wahle, North Canton, OH (US); Theodore R. Ohrn, Alliance, OH (US); Kurt E. Kneidel, Alliance, OH (US); Keith Gerard Rackers, Louisville, OH (US); James Erik Blake, Uniontown, OH (US); Shankar Nataraj, Allentown, PA (US); Rene Hendrik Elias van Doorn, Obersulm-Willsbach (DE); Merrill Anderson Wilson, West Jordan, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/699,145

(22) Filed: Jan. 29, 2007

(65) Prior Publication Data

US 2007/0137478 A1 Jun. 21, 2007

Related U.S. Application Data

(62) Division of application No. 10/635,695, filed on Aug. 6, 2003, now Pat. No. 7,179,323.

(51) Int. Cl.
*B01D 53/22* (2006.01)
(52) U.S. Cl. .................................. 96/7; 95/54
(58) Field of Classification Search ............... 95/54; 96/7, 9
See application file for complete search history.

(56) References Cited

U.S. PATENT DOCUMENTS 3,278,266 A 10/1966 Weich et al.

(Continued)

FOREIGN PATENT DOCUMENTS

DE 10056787 11/2000

(Continued)

OTHER PUBLICATIONS

Christian Gindorf, et al., "Chromium vaporisation from Fe, Cr base alloys used as interconnect in fuel cells", Materials Technology, Steel Research 72 (2001) No. 11 & 12, pp. 528-533.

(Continued)

*Primary Examiner*—Robert A. Hopkins
(74) *Attorney, Agent, or Firm*—Keith D. Gourley

(57) ABSTRACT

An ion transport membrane system comprising (a) a pressure vessel having an interior, an exterior, an inlet, and an outlet; (b) a plurality of planar ion transport membrane modules disposed in the interior of the pressure vessel and arranged in series, each membrane module comprising mixed metal oxide ceramic material and having an interior region and an exterior region, wherein any inlet and any outlet of the pressure vessel are in flow communication with exterior regions of the membrane modules; and (c) one or more gas manifolds in flow communication with interior regions of the membrane modules and with the exterior of the pressure vessel.

The ion transport membrane system may be utilized in a gas separation device to recover oxygen from an oxygen-containing gas or as an oxidation reactor to oxidize compounds in a feed gas stream by oxygen permeated through the mixed metal oxide ceramic material of the membrane modules.

5 Claims, 12 Drawing Sheets

U.S. PATENT DOCUMENTS

| | | | |
|---|---|---|---|
| 3,935,295 A | 1/1976 | La Hue et al. |
| 4,341,745 A | 7/1982 | Zopff et al. |
| 4,469,588 A | 9/1984 | Hettinger, Jr. et al. |
| 4,548,797 A | 10/1985 | Sauer et al. |
| 4,629,611 A | 12/1986 | Fan |
| 4,721,824 A | 1/1988 | McWilliams et al. |
| 4,980,049 A | 12/1990 | Huh et al. |
| 5,306,411 A | 4/1994 | Mazanec et al. |
| 5,356,728 A | 10/1994 | Balachandran et al. |
| 5,364,506 A | 11/1994 | Gur et al. |
| 5,591,315 A | 1/1997 | Mazanec et al. |
| 5,681,373 A | 10/1997 | Taylor et al. |
| 5,693,212 A | 12/1997 | Mazanec et al. |
| 5,712,220 A | 1/1998 | Carolan et al. |
| 5,744,015 A | 4/1998 | Mazanec et al. |
| 5,750,279 A | 5/1998 | Carolan et al. |
| 5,817,597 A | 10/1998 | Carolan et al. |
| 5,820,654 A | 10/1998 | Gottzman et al. |
| 5,820,655 A | 10/1998 | Gottzman et al. |
| 5,868,918 A | 2/1999 | Adler et al. |
| 5,942,649 A | 8/1999 | Blanchet-Fincher et al. |
| 5,980,840 A | 11/1999 | Kleefisch et al. |
| 6,019,885 A | 2/2000 | Mazanec et al. |
| 6,056,807 A | 5/2000 | Carolan et al. |
| 6,060,177 A | 5/2000 | Bornstein et al. |
| 6,139,604 A | 10/2000 | Gottzman et al. |
| 6,139,810 A | 10/2000 | Gottzman et al. |
| 6,293,084 B1 | 9/2001 | Drnevich et al. |
| 6,309,612 B1 | 10/2001 | Balachandran et al. |
| 6,402,988 B1 | 6/2002 | Gottzman et al. |
| 6,551,386 B2 | 4/2003 | Weiler |
| 6,602,324 B2 | 8/2003 | Stein et al. |
| 6,777,370 B2 | 8/2004 | Chen |
| 6,805,728 B2 | 10/2004 | Sweeney et al. |
| 7,122,072 B2 * | 10/2006 | Carolan et al. ............... 95/54 |
| 7,179,323 B2 | 2/2007 | Stein et al. |
| 2003/0039601 A1 | 2/2003 | Halvorson et al. |
| 2004/0151836 A1 | 8/2004 | Wustman et al. |
| 2004/0186018 A1 | 9/2004 | Carolan et al. |

FOREIGN PATENT DOCUMENTS

| | | |
|---|---|---|
| DE | 10056789 | 11/2000 |
| DE | 10114173 | 3/2001 |
| DE | 10029882 | 6/2001 |
| EP | 0399833 | 5/1996 |
| EP | 0438902 | 5/1997 |
| EP | 0875283 | 11/1998 |
| EP | 0875285 | 11/1998 |
| EP | 1504811 A1 | 2/2005 |
| JP | 2002320822 A | 11/2002 |
| JP | 03137505 | 5/2003 |
| RU | 2182036 C2 | 5/2002 |
| WO | 9921649 | 5/1999 |
| WO | 0106589 | 1/2001 |
| WO | 2004/052506 A2 | 6/2004 |

OTHER PUBLICATIONS

Christian Gindorf, et al., "Determination of Chromium Vaporization Rates of Different Interconnect Alloys by Transpiration Experiments", Electrochemical Society Proceedings, vol. 2001-16, pp. 739-802.

Zheng, Li-Bo, et al., "Adsorption of chromium (VI) by Mg/Al-layered double oxides", Journal written in Chinese, SciFinder, Aug. 6, 2004, p. 2.

* cited by examiner

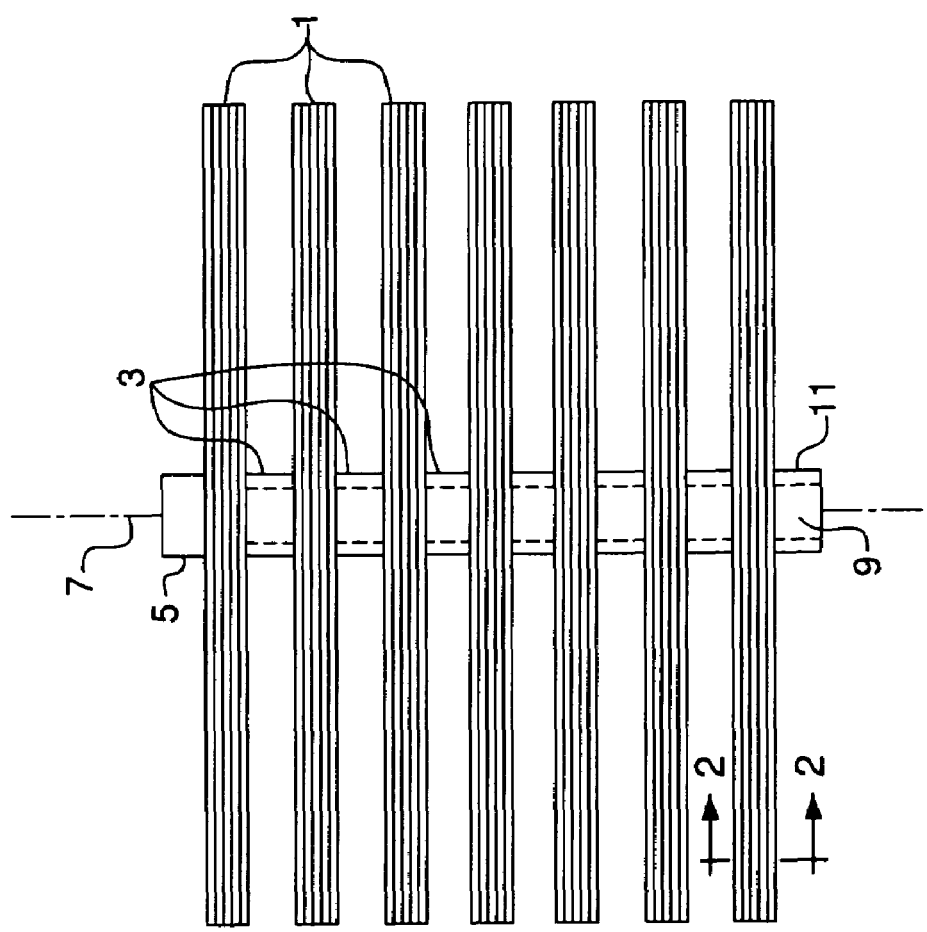

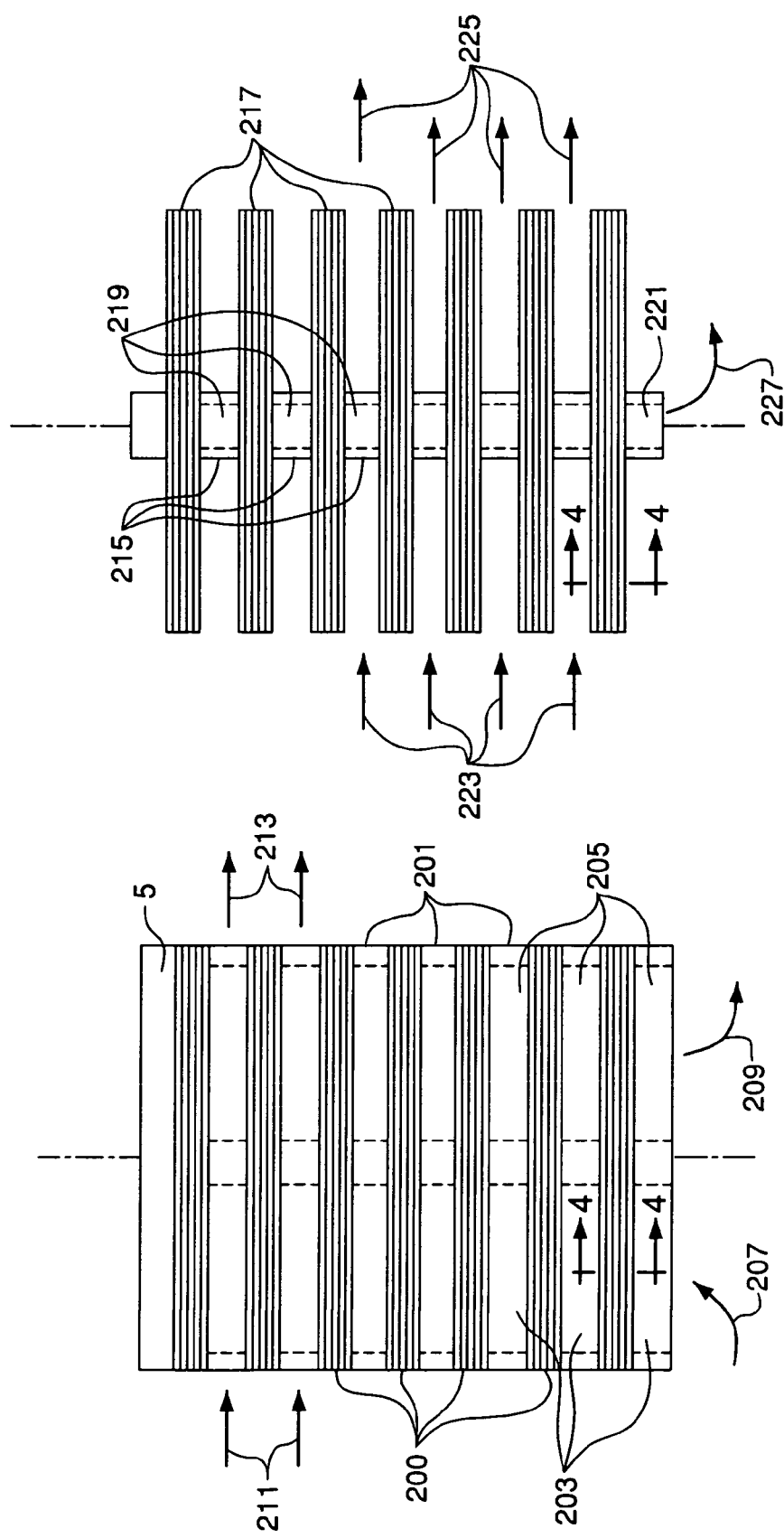

ION TRANSPORT MEMBRANE MODULE AND VESSEL SYSTEM

CROSS-REFERENCE TO RELATED APPLICATIONS

This is a divisional of application Ser. No. 10/635,695, filed on Aug. 6, 2003, now U.S. Pat. No. 7,179,323 the specification and claims which are incorporated by reference and made a part of this Application.

STATEMENT REGARDING FEDERALLY SPONSORED RESEARCH OR DEVELOPMENT

This invention was made with government support under Contract Numbers DE-FC26-98FT40343 and DE-FC26-97FT96052 between Air Products and Chemicals, Inc. and the U.S. Department of Energy. The Government has certain rights to this invention.

BACKGROUND OF THE INVENTION

The permeation of oxygen ions through ceramic ion transport membranes is the basis for a variety of gas separation devices and oxidation reactor systems operating at high temperatures in which permeated oxygen is recovered on the permeate side as a high purity oxygen product or is reacted on the permeate side with oxidizable compounds to form oxidized or partially oxidized products. The practical application of these gas separation devices and oxidation reactor systems requires membrane assemblies having large surface areas, means to contact feed gas with the feed sides of the membranes, and means to withdraw product gas from the permeate sides of the membranes. These membrane assemblies may comprise a large number of individual membranes arranged and assembled into modules having appropriate gas flow piping to introduce feed gas into the modules and withdraw product gas from the modules.

Ion transport membranes may be fabricated in either planar or tubular configurations. In the planar configuration, multiple flat ceramic plates are fabricated and assembled into stacks or modules having piping means to pass feed gas over the planar membranes and to withdraw product gas from the permeate side of the planar membranes. In tubular configurations, multiple ceramic tubes may be arranged in bayonet or shell-and-tube configurations with appropriate tube sheet assemblies to isolate the feed and permeate sides of the multiple tubes.

The individual membranes used in planar or tubular module configurations typically comprise very thin layers of active membrane material supported on material having large pores or channels that allow gas flow to and from the surfaces of the active membrane layers. The ceramic membrane material and the components of the membrane modules can be subjected to significant mechanical stresses during normal steady-state operation and especially during unsteady-state startup, shutdown, and upset conditions. These stresses may be caused by thermal expansion and contraction of the ceramic material and by dimensional variance caused by chemical composition or crystal structure changes due to changes in the oxygen stoichiometry of the membrane material. These modules may operate with significant pressure differentials across the membrane and membrane seals, and stresses caused by these pressure differentials must be taken into account in membrane module design. In addition, the relative importance of these phenomena may differ depending on whether the modules are operated in gas separation or oxidation service. The potential operating problems caused by these phenomena may have a significant negative impact on the purity of recovered products and on membrane operating life.

There is a need in the field of high temperature ceramic membrane reactor systems for new membrane module and vessel designs that address and overcome these potential operating problems. Such designs should include features to allow efficient operation, long membrane life, minimum capital cost, and the ability to specify membrane systems over a wide range of production rates. Embodiments of the invention disclosed herein address these design problems and include improved module and vessel designs for both oxygen production and oxidation systems.

BRIEF SUMMARY OF THE INVENTION

An embodiment of the invention relates to an ion transport membrane system comprising a pressure vessel having an interior, an exterior, an inlet, and an outlet; a plurality of planar ion transport membrane modules disposed in the interior of the pressure vessel and arranged in series, each membrane module comprising mixed metal oxide ceramic material and having an interior region and an exterior region, wherein any inlet and any outlet of the pressure vessel are in flow communication with exterior regions of the membrane modules; and one or more gas manifolds in flow communication with interior regions of the membrane modules and with the exterior of the pressure vessel.

Each planar membrane module typically comprises a plurality of wafers having planar parallel surfaces; the pressure vessel may be cylindrical and may have an axis that is parallel to some or all of the planar parallel surfaces of the wafers.

The system may further comprise a flow containment duct disposed in the interior of the pressure vessel, wherein the flow containment duct surrounds the plurality of planar ion transport membrane modules and is in flow communication with any inlet and any outlet of the pressure vessel. The one or more gas manifolds may comprise an inlet manifold and an outlet manifold; the interior region of any planar membrane module may be in flow communication with the inlet manifold via a secondary inlet manifold and may be in flow communication with the outlet manifold via a primary outlet manifold; and within the flow containment duct, the secondary inlet manifold and the primary outlet manifold of any planar membrane module may be combined to form a nested manifold. The flow containment duct may comprise an oxidation-resistant metal alloy containing iron and one or more elements selected from the group consisting of nickel and chromium.

The one or more gas manifolds may be disposed in the interior of the pressure vessel or exterior to the pressure vessel. The one or more gas manifolds may be insulated internally, externally, or internally and externally.

At least two of the planar ion transport membrane modules define a module axis, wherein the pressure vessel may be cylindrical and may have an axis that is parallel to the module axis. At least two of the planar ion transport membrane modules may define a module axis, wherein the pressure vessel may be cylindrical and may have an axis that is perpendicular to the module axis.

The system may further comprise insulation disposed in the interior of the pressure vessel. The insulation may be disposed in a region between an interior surface of the pressure vessel and the membrane modules, wherein the insulation forms a cavity that surrounds the membrane modules and the cavity is in flow communication with any inlet and any outlet of the pressure vessel. Alternatively, the insulation may be in contact with the interior surface of the pressure vessel. In another alternative, the insulation may not be not in contact with the interior surface of the pressure vessel. In yet another alternative, the system may further comprise a flow containment duct disposed in the interior of the pressure vessel, wherein the planar ion transport membrane modules are disposed within the duct, and wherein the insulation is disposed between an interior surface of the pressure vessel and an exterior surface of the duct.

The insulation may (a) be in contact with the interior surface of the pressure vessel and is not in contact with the exterior surface of the duct; (b) be in contact with the interior surface of the pressure vessel and is in contact with the exterior surface of the duct; (c) not be in contact with the interior surface of the pressure vessel and not be in contact with the exterior surface of the duct; or (d) not be in contact with the interior surface of the pressure vessel and be in contact with the exterior surface of the duct.

The system may further comprise a flow containment duct disposed in the interior of the pressure vessel and in flow communication with the inlet and outlet of the pressure vessel, wherein the planar ion transport membrane modules are disposed within the duct, wherein the insulation is disposed between an interior surface of the duct and the membrane modules, and wherein the insulation forms a cavity that surrounds the membrane modules and is in flow communication with any inlet and any outlet of the pressure vessel. The system may further comprise insulation around the exterior of the pressure vessel.

The one or more gas manifolds may comprise metal and the ion transport modules may comprise ceramic, wherein connections between the one or more gas manifolds and the modules may include ceramic-to-metal seals, and wherein the ceramic-to-metal seals may be surrounded by the insulation.

The insulation may comprise one or more materials selected from the group consisting of fibrous alumina, fibrous alumina silicate, porous alumina, porous alumina silicate. The insulation may comprise one or more materials selected from the group consisting of magnesium oxide, calcium oxide, copper oxide, calcium carbonate, sodium carbonate, strontium carbonate, zinc oxide, strontium oxide, and alkaline-earth-containing perovskites.

The system may further comprise a guard bed disposed between any inlet of the pressure vessel and a first membrane module. This guard bed may contain one or more materials selected from the group consisting of magnesium oxide, calcium oxide, copper oxide, calcium carbonate, sodium carbonate, strontium carbonate, zinc oxide, strontium oxide, and alkaline-earth-containing perovskites.

The ion transport membrane system may further comprise
(a) one or more additional pressure vessels, each having an interior, an exterior, an inlet, and an outlet;
(b) a plurality of planar ion transport membrane modules disposed in the interior of each of the one or more pressure vessels and arranged in series, each membrane module comprising mixed metal oxide ceramic material and having an interior region and an exterior region, wherein any inlet and any outlet of the pressure vessel are in flow communication with exterior regions of the membrane modules; and
(c) one or more gas manifolds in flow communication with interior regions of the membrane modules and with the exterior of the pressure vessel;

wherein at least two of the pressure vessels are arranged in series such that the outlet of one pressure vessel is in flow communication with the inlet of another pressure vessel.

Alternatively, the ion transport membrane system may further comprise
(a) one or more additional pressure vessels, each having an interior, an exterior, an inlet, and an outlet;
(b) a plurality of planar ion transport membrane modules disposed in the interior of each of the one or more pressure vessels and arranged in series, each membrane module comprising mixed metal oxide ceramic material and having an interior region and an exterior region, wherein any inlet and any outlet of the pressure vessel are in flow communication with exterior regions of the membrane modules; and
(c) one or more gas manifolds in flow communication with the interior regions of the membrane modules and with the exterior of the pressure vessel;

wherein at least two of the pressure vessels are arranged in parallel such that any inlet of one pressure vessel and any inlet of another pressure vessel are in flow communication with a common feed conduit.

The system may further comprise an additional plurality of planar ion transport membrane modules disposed in the interior of the pressure vessel and arranged in series, wherein the plurality of planar ion transport membrane modules and the additional plurality of planar ion transport membrane modules lie on parallel axes.

A further embodiment if the invention is an ion transport membrane system comprising
(a) a pressure vessel having an interior, an exterior, an inlet, and an outlet;
(b) a plurality of planar ion transport membrane modules disposed in the interior of the pressure vessel and arranged in a series of banks of modules, each bank containing two or more modules in parallel, each membrane module comprising mixed metal oxide ceramic material and having an interior region and an exterior region, wherein any inlet and any outlet of the pressure vessel are in flow communication with exterior regions of the membrane modules; and
(c) one or more gas manifolds in flow communication with interior regions of the membrane modules and with the exterior of the pressure vessel.

An alternative embodiment of the invention is an ion transport membrane system comprising
(a) a pressure vessel having an interior, an exterior, an inlet, and an outlet;
(b) a plurality of ion transport membrane modules disposed in the interior of the pressure vessel and arranged in series, each membrane module comprising mixed metal oxide ceramic material and having an interior region and an exterior region, wherein any inlet and any outlet of the pressure vessel are in flow communication with exterior regions of the membrane modules; and
(c) one or more gas manifolds disposed in the interior of the pressure vessel and in flow communication with the interior regions of the membrane modules and with the exterior of the pressure vessel.

Another alternative embodiment of the invention is an ion transport membrane system comprising
(a) a pressure vessel having an interior, an exterior, an inlet, and an outlet;
(b) a membrane stack or module assembly disposed in the interior of the pressure vessel, the assembly having a plurality of planar wafers comprising mixed metal oxide ceramic material, each wafer having an interior region and an exterior region, and a plurality of hollow ceramic spacers, wherein the stack or module assembly is formed by alternating wafers and spacers such that the interiors of the wafers are in flow communication via the hollow spacers, the wafers are oriented parallel to one another, and the alternating spacers and wafers are oriented coaxially to form the stack or module such that the wafers are perpendicular to the stack or module axis;

(c) a gas manifold shroud assembly disposed around the membrane stack or module assembly within the interior of the pressure vessel, wherein the shroud assembly separates the stack or module into at least a first wafer zone and a second wafer zone, places any inlet of the pressure vessel in flow communication with exterior regions of the wafers in the first wafer zone, and places exterior regions of the wafers in the first wafer zone in series flow communication with exterior regions of the wafers of the second wafer zone.

This ion transport membrane system may further comprise a plurality of additional wafer zones formed by the gas manifold shroud assembly, wherein the shroud assembly places the additional wafer zones in series flow communication with one another, and wherein one of the additional wafer zones is in flow communication with any outlet of the pressure vessel.

Another embodiment of the invention includes a method for the recovery of oxygen from an oxygen-containing gas comprising (a) providing an ion transport membrane separator system comprising
  (1) a pressure vessel having an interior, an exterior, an inlet, and an outlet;
  (2) a plurality of planar ion transport membrane modules disposed in the interior of the pressure vessel and arranged in series, each membrane module comprising mixed metal oxide ceramic material and having an interior region and an exterior region, wherein any inlet and any outlet of the pressure vessel are in flow communication with exterior regions of the membrane modules; and
  (3) one or more gas manifolds in flow communication with the interior regions of the membrane modules and with the exterior of the pressure vessel;

(b) providing a heated, pressurized oxygen-containing feed gas stream, introducing the feed gas stream via any pressure vessel inlet to the exterior regions of the membrane modules, and contacting the feed gas stream with the mixed metal oxide ceramic material;

(c) permeating oxygen ions through the mixed metal oxide ceramic material, recovering high purity oxygen gas product in the interior regions of the membrane modules, and withdrawing the high purity oxygen gas product from the interior regions of the membrane modules through the gas manifolds to the exterior of the pressure vessel; and (d) withdrawing an oxygen-depleted oxygen-containing gas from any pressure vessel outlet.

The pressure of the oxygen-containing feed gas typically is greater than the pressure of the high purity oxygen gas product. The ion transport membrane separator system further may comprise a flow containment duct that has an interior and an exterior and is disposed in the interior of the pressure vessel, and wherein the flow containment duct surrounds the plurality of planar ion transport membrane modules and is in flow communication with any inlet and any outlet of the pressure vessel such that the oxygen-containing feed gas passes through the interior of the flow containment duct.

The pressure differential between the interior and the exterior of the flow containment duct at any point between the inlet and outlet of the pressure vessel may be maintained at a value equal to or greater than zero, wherein the pressure in the interior of the duct may be equal to or greater than the pressure in the pressure vessel exterior to the duct.

Another embodiment of the invention relates to an oxidation process comprising (a) providing an ion transport membrane reactor system comprising
  (1) a pressure vessel having an interior, an exterior, an inlet, and an outlet;
  (2) a plurality of planar ion transport membrane modules disposed in the interior of the pressure vessel and arranged in series, each membrane module comprising mixed metal oxide ceramic material and having an interior region and an exterior region, wherein any inlet and any outlet of the pressure vessel are in flow communication with exterior regions of the membrane modules; and
  (3) one or more gas manifolds in flow communication with interior regions of the membrane modules and with the exterior of the pressure vessel;

(b) providing a heated, pressurized reactant feed gas stream, introducing the reactant feed gas stream via any pressure vessel inlet to the exterior regions of the membrane modules;

(c) providing an oxygen-containing oxidant gas to the interior regions of the membrane modules, permeating oxygen ions through the mixed metal oxide ceramic material, reacting oxygen with components in the reactant feed gas stream in the exterior regions of the membrane modules to form oxidation products therein, and withdrawing the oxidation products from the exterior regions of the membrane modules through any outlet to the exterior of the pressure vessel to provide an oxidation product stream; and (d) withdrawing oxygen-depleted oxygen-containing gas from the interior regions of the membrane modules via the one or more manifolds to the exterior of the pressure vessel.

In this embodiment, the pressure of the pressurized reactant feed gas stream typically is greater than the pressure of the oxygen-containing oxidant gas. The ion transport membrane reactor system may further comprise a flow containment duct that has an interior and an exterior and is disposed in the interior of the pressure vessel, wherein the flow containment duct surrounds the plurality of planar ion transport membrane modules and is in flow communication with the inlet and the outlet of the pressure vessel such that the pressurized reactant feed gas stream passes through the interior of the flow containment duct.

The pressure differential between the interior and the exterior of the flow containment duct at any point between the inlet and outlet of the pressure vessel may be maintained at a value equal to or greater than zero, and the pressure in the interior of the duct may be equal to or greater than the pressure in the pressure vessel exterior to the duct.

The pressurized reactant feed gas stream may comprise one or more hydrocarbons having one or more carbon atoms, one of which may comprise methane. The oxidation product stream may comprise hydrogen and carbon oxides.

Another embodiment of the invention relates to an ion transport membrane reactor system comprising (a) a pressure vessel having an interior, an exterior, an inlet, and an outlet;
(b) a plurality of ion transport membrane modules disposed in the interior of the pressure vessel, wherein a first plurality of modules are arranged in series; and
(c) catalyst disposed between any two membrane modules in the first plurality of modules.

The reactor system may further comprise a second plurality of modules arranged in series, wherein the first plurality of modules is arranged in parallel with the second plurality of modules.

In this reactor system, the catalyst may be disposed between any modules that are arranged in parallel, between any modules that are arranged in series, or between any modules that are arranged in parallel and between any modules that are arranged in series. The catalyst may comprise one or more metals or compounds containing metals selected from the group consisting of nickel, cobalt, platinum, gold, palladium, rhodium, ruthenium, and iron. The catalyst may be placed between a number of modules in series and the activity of the catalyst may vary at different locations between the modules in series.

BRIEF DESCRIPTION OF SEVERAL VIEWS OF THE DRAWINGS

FIG. 1 is a schematic front view of a membrane wafer stack or module for use in oxygen recovery or in oxidation processes according to embodiments of the present invention.

FIG. 2A is a side view of the membrane wafer stack or module of FIG. 1 for use in oxidation processes.

FIG. 2B is a side view of the membrane wafer stack or module of FIG. 1 for use in oxygen recovery.

Figure 3A:
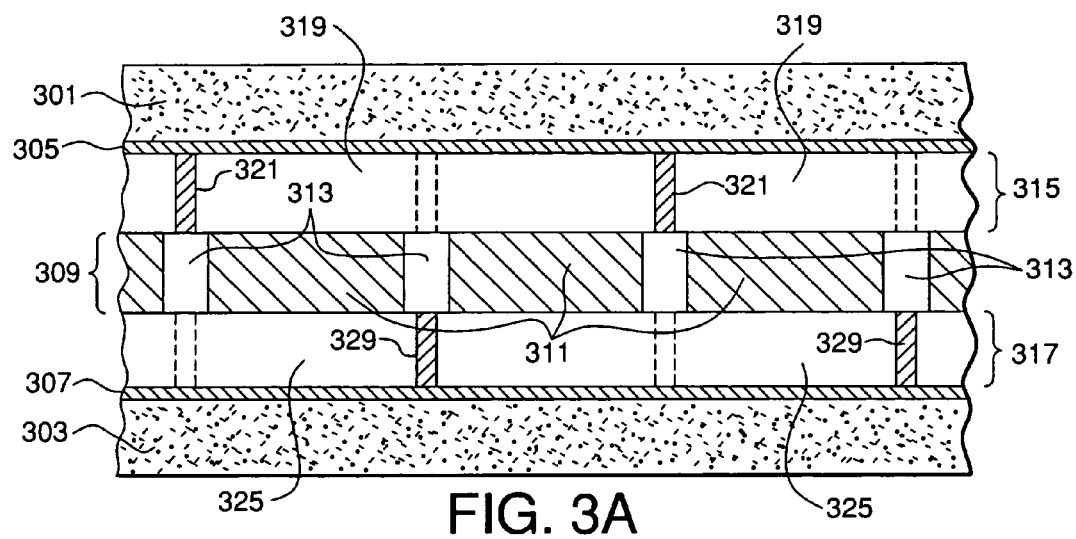
FIG. 3A is a sectional view of a membrane wafer of FIGS. 1, 2A, and 2B.

The drawings of FIGS. 1-16 are not necessarily to scale.

DETAILED DESCRIPTION OF THE INVENTION

Embodiments of the present invention are directed toward the design and operation of ion transport membrane systems that utilize multiple membrane modules operating in series for use in either oxygen recovery or oxidation processes. It has been found that when oxygen transport across a membrane results in an exothermic reaction, for example in the production of synthesis gas from methane, the degree of reactant conversion across an individual membrane must be limited to prevent an excessive temperature gradient across the membrane. It also has been found that when a membrane is transporting oxygen into a lower-pressure permeate stream, the amount of oxygen extraction across an individual membrane must be limited to prevent an excessive oxygen vacancy gradient in the membrane material between the leading edge and trailing edge of the membrane. Excessive temperature or oxygen vacancy gradients may cause excessive stresses in the membranes that could limit the membrane life quite drastically.

The present invention addresses these problems by orienting multiple membrane modules or banks of modules in series so that the amount of oxygen extracted across membranes in each module is sufficiently low to prevent an excessive oxygen vacancy gradient in the membrane material. The amount of oxygen extracted across each individual module may be limited by appropriate module sizing, and the total desired degree of oxygen extraction may be achieved by operating a selected plurality of modules in series. When oxygen transport across a membrane results in an exothermic reaction, the degree of reactant conversion across individual membranes in each module should be sufficiently low to prevent an excessive temperature gradient across the membrane in the flow direction. The degree of conversion across each individual module may be limited by appropriate module sizing, and the total desired conversion may be achieved by operating a plurality of selected modules in series.

The gas flowing over the outside of the membranes in each membrane module preferably is at a higher pressure than the gas on the inside of the membranes in the interior of the module as described below. In order to minimize gas-phase mass transport resistance, the higher pressure gas should be directed across the outer surface of the membranes at high velocity and as uniformly as possible.

Because of the unique operating conditions of an ion transport membrane system, the system design may include a pressure vessel, an optional gas flow containment device or duct disposed within the vessel and surrounding the series membrane modules, and thermal insulation within the vessel to allow the vessel wall to operate at a lower temperature than the membrane modules. The proper physical positioning of each of these components as described below improves the prospects for fabrication, installation, and long-term operability of the system. In addition, other internal design features are disclosed that may contribute to the long-term reliability of the overall ion transport membrane system.

The following definitions apply to terms used in the description of the embodiments of the invention presented herein.

An ion transport membrane module is an assembly of a plurality of membrane structures which has a gas inflow region and a gas outflow region disposed such that gas flows across the external surfaces of the membrane structures. Gas flowing from the inflow region to the outflow region of a membrane module changes in composition as it passes across the surfaces of the membrane structures in the module. Each membrane structure has an oxygen-containing gas feed side and a permeate side separated by an active membrane layer or region that allows oxygen ions to permeate therethrough. Each membrane structure also has an interior region and an exterior region. In one embodiment, in which the membrane module is operated as an oxygen separation device, the oxygen-containing gas feed side may be adjacent to the exterior region of the membrane structure and the permeate side may be adjacent to the interior region of the membrane structure.

In an alternative embodiment, in which the membrane module is operated as an oxidation reaction device, the oxygen-containing gas feed side may be adjacent to the interior region of the membrane structure and the permeate side may be adjacent to the exterior region of the membrane structure. In this alternative embodiment, a reactant feed gas flows through the exterior region of the membrane structure and reacts with the permeated oxygen. Thus in this embodiment the permeate side is also the reactant gas side of the membrane structure.

A membrane structure may have a tubular configuration in which an oxygen-containing gas flows in contact with one side of the tube (i.e., in either the interior region or the exterior region of the tube) and oxygen ions permeate through active membrane material in or on the tube walls to the other side of the tube. The oxygen-containing gas may flow inside or outside of the tube in a direction generally parallel to the tube axis, or conversely may flow over the outer side of the tube in a direction which is not parallel to the tube axis. A module comprises multiple tubes arranged in bayonet or shell-and-tube configurations with appropriate tube sheet assemblies to isolate the feed and permeate sides of the multiple tubes.

Alternatively, the membrane structure may have a planar configuration in which a wafer having a center or interior region and an exterior region is formed by two parallel planar members sealed about at least a portion of the peripheral edges thereof. Oxygen ions permeate through active membrane material that may be placed on either or both surfaces of a planar member. Gas can flow through the center or interior region of the wafer, and the wafer has one or more gas flow openings to allow gas to enter and/or exit the interior region of the wafer. Thus oxygen ions may permeate from the exterior region into the interior region, or conversely may permeate from the interior region to the exterior region.

Components of a membrane module include an active membrane layer that transports or permeates oxygen ions and may also transport electrons, structural components that support the active membrane layer, and structural components to direct gas flow to and from the membrane surfaces. The active membrane layer typically comprises mixed metal oxide ceramic material and also may comprise one or more elemental metals. The structural components of the membrane module may be made of any appropriate material such as, for example, mixed metal oxide ceramic materials, and also may comprise one or more elemental metals. Any of the active membrane layer and structural components may be made of the same material.

Single modules may be arranged in series, which means that a number of modules are disposed along a single axis. Typically, gas which has passed across the surfaces of the membrane structures in a first module flows from the outflow region of that module, after which some or all of this gas enters the inflow region of a second module and thereafter flows across the surfaces of the membrane structures in the second module. The axis of a series of single modules may be parallel or nearly parallel to the overall flow direction or axis of the gas passing over the modules in series.

Modules may be arranged in banks of two or more parallel modules wherein a bank of parallel modules lies on an axis that is not parallel to, and may be generally orthogonal to, the overall flow direction or axis of the gas passing over the modules. Multiple banks of modules may be arranged in series, which means by definition that banks of modules are disposed such that at least a portion of gas which has passed across the surfaces of the membrane structures in a first bank of modules flows across the surfaces of the membrane structures in a second bank of modules.

Any number of single modules or banks of modules may be arranged in series. In one embodiment, the modules in a series of single modules or in a series of banks of modules may lie on a common axis or common axes in which the number of axes equals one or equals the number of modules in each bank. In another embodiment described below, successive modules or banks of modules in a series of modules or banks of modules may be offset in an alternating fashion such that the modules lie on at least two axes or on a number of axes greater than the number of modules in a bank, respectively. Both of these embodiments are included in the definition of modules in series as used herein.

Preferably, the gas in contact with the outer surfaces in the exterior regions of the membrane modules is at a higher pressure than the gas within the interior regions of the membrane modules.

A flow containment duct is defined as a conduit or closed channel surrounding a plurality of series membrane modules which directs flowing gas over modules in series.

A manifold is an assembly of pipes or conduits which directs gas to enter and/or exit the interior regions of the membrane modules. Two manifolds may be combined by installing a first or inner conduit within a second or outer conduit wherein the first conduit provides a first manifold and the annulus between the conduits provides a second manifold. The conduits may be concentric or coaxial, wherein these two terms have the same meaning. Alternatively, the conduits may not be concentric or coaxial but may have separate parallel or nonparallel axes. This configuration of inner and outer conduits to provide a combined manifold function is defined herein as a nested manifold.

Flow communication means that components of membrane modules and vessel systems are oriented relative to one another such that gas can flow readily from one component to another component.

A wafer is a membrane structure having a center or interior region and an exterior region wherein the wafer is formed by two parallel planar members sealed about at least a portion of the peripheral edges thereof. Active membrane material may be placed on either or both surfaces of a planar member. Gas can flow through the center or interior region of the wafer, i.e., all parts of the interior region are in flow communication, and the wafer has one or more gas flow openings to allow gas to enter and/or exit the interior region of the wafer. The interior region of the wafer may include porous and/or channeled material that allows gas flow through the interior region and mechanically supports the parallel planar members. The active membrane material transports or permeates oxygen ions but is impervious to the flow of any gas.

Oxygen is the generic term for forms of oxygen comprising the element having an atomic number of 8. The generic term oxygen includes oxygen ions as well as gaseous oxygen ($O_2$ or dioxygen). An oxygen-containing gas may include, but is not limited to, air or gas mixtures comprising one or more components selected from the group consisting of oxygen, nitrogen, water, carbon monoxide, and carbon dioxide.

A reactant gas or reactant feed gas is a gas comprising at least one component which reacts with oxygen to form an oxidation product. A reactant gas may contain one or more hydrocarbons, wherein a hydrocarbon is a compound comprising primarily or exclusively hydrogen and carbon atoms. A hydrocarbon also may contain other atoms, such as, for example, oxygen.

Synthesis gas is a gas mixture containing at least hydrogen and carbon oxides.

An ion transport membrane is an active layer of ceramic membrane material comprising mixed metal oxides capable of transporting or permeating oxygen ions at elevated temperatures. The ion transport membrane also may transport electrons as well as oxygen ions, and this type of ion transport membrane typically is described as a mixed conductor membrane. The ion transport membrane also may include one or more elemental metals thereby forming a composite membrane.

An ion transport membrane system is a generic term for an array of multiple ion transport membrane modules used for oxygen recovery or for oxidation reactions. An ion transport membrane separation system is an ion transport membrane system used for separating and recovering oxygen from an oxygen-containing gas. An ion transport membrane reactor system is an ion transport membrane system used for oxidation reactions.

The series membrane modules in the embodiments of the present invention may be fabricated in either tubular or planar configurations as described above. Planar configurations are preferred for many applications, and various configurations of planar membrane modules are possible. Planar membrane module configurations are described, for example, in copending United States patent application having Ser. No. 10/394,620 filed on Mar. 21, 2003, which application is incorporated herein by reference.

The use of the indefinite articles "a" and "an" means one or more when applied to any feature of the present invention described in the specification and claims. The use of "a" and "an" does not limit the meaning to a single feature unless such a limit is specifically stated.

An exemplary planar membrane module is illustrated in FIG. 1, which is a schematic front view of a membrane wafer stack or module for use in oxygen recovery or in oxidation processes according to embodiments of the present invention. The stack or module in this example comprises a plurality of planar wafers 1 separated by hollow spacers 3 and having an optional cap 5. The wafers and spacers are placed and joined in alternating fashion as shown and form stack or module axis 7. The wafers may be any shape in plan view, but square or rectangular shapes are generally preferred. The dimension of any side of a square or rectangular wafer may be between 2 and 45 cm. The number of wafers in a stack may range up to 1000.

The exterior region of the stack or module is that region surrounding the outer surfaces of the wafers and spacers. As described in detail below, wafers 1 have interior regions which are placed in flow communication with the interiors of spacers 3 wherein gas-tight seals are formed between the wafers and spacers. Opening 9 in bottom hollow spacer 11 allows gas to enter and/or exit the interior region of the stack or module wherein the interior region of the module is formed by the interior regions of the wafers and the openings in the hollow spacers. Thus opening 9 is in flow communication with the interior region of the module.

A side view of the module of FIG. 1 is shown in FIG. 2A, which illustrates an exemplary configuration for use in oxidation processes. In this example, spacers 201 between wafers 200 each have two separate sets of openings 203 and 205. Openings 203 in spacers 201, and additional openings in spacers disposed above and below spacers 201, form an internal manifold that is in flow communication with the interior regions of the wafers by way of appropriately placed openings (not shown) through the layers of the wafers at the left ends of the wafers. These openings through the layers of the wafers also place the internal openings 203 of spacers 201 and the internal openings in spacers above and below spacers 201 in flow communication with each other. Likewise, openings 205 in spacers 201, and additional openings in spacers disposed above and below spacers 201, form an internal manifold that is in flow communication with the interior regions of the wafers by way of appropriately placed openings (not shown) through the layers of the wafers at the right ends of the wafers. These openings through the layers of the wafers also place the internal openings 205 of spacers 201 and the internal openings in spacers above and below spacers 201 in flow communication with each other.

In this example configuration, gas stream 207 flows upward through the internal manifold formed by openings 203 and openings above them, and then flows horizontally through the interior regions of the wafers. Gas from the interior regions of the wafers then flows downward through the interior manifold formed by openings 205 and openings above them, and exits the module as gas stream 209. A second gas 211 at the gas inflow region of the module flows through the exterior region of the module on either side of spacers 201 and in contact with the outer surfaces of wafers 200. Gas 213, after contacting the outer surfaces of wafers 200, flows through the gas outflow region of the module. The module may operate in a typical temperature range of 600 to 1100° C.

The module of FIG. 2A may be used as part of an oxidation reactor system wherein representative gas 211 is a reactant gas and representative gas 207 is an oxidant or oxygen-containing gas. The oxygen-containing gas 207 flows through the internal manifold via openings 203 and through the interior regions of the wafers, oxygen permeates the active membrane material in the planar members of the wafers, and oxygen-depleted gas 209 flows from the module via openings 205. Permeated oxygen reacts with reactant components in reactant gas or reactant feed gas 211 as the gas flows over the outer surfaces of the wafers and forms oxidation products. Exit gas 213 from the module contains the oxidation products and unreacted components. In one example embodiment, reactant gas 211 comprises methane or a methane-containing feed gas and exit gas 213 is a mixture of unreacted methane, hydrogen, carbon oxides, and water, oxygen-containing gas 207 is air, and oxygen-depleted gas 209 is enriched in nitrogen and depleted in oxygen relative to gas 207. Typically, the pressure of gases 211 and 213 is higher than the pressure of the gas in the interior region of the module.

An alternative side view of the module of FIG. 1 is shown in FIG. 2B, which illustrates an exemplary configuration for use in processes for the recovery of high purity oxygen from an oxygen-containing gas. In this example, spacers 215 between wafers 217 have openings 219 wherein openings 219 and additional openings in spacers disposed below spacers 215 form an internal manifold that is in flow communication with the interior regions of the wafers. Opening 221 thus places the interior region of the module in flow communication with a product gas conduit (not shown). Oxygen-containing gas 223, for example air, at the gas inflow region of the module flows through the exterior region of the module on either side of spacers 215 and in contact with the outer surfaces of wafers 217. After contacting the outer surfaces of wafers 217, oxygen-depleted gas 225 flows through the gas outflow region of the module. The module may operate in a typical temperature range of 600° C. to 1100° C.

As the oxygen-containing gas flows through the exterior region of the module and the gas contacts the outer surfaces of the wafers, oxygen permeates the active membrane material in the planar members of the wafers and high purity oxygen gas collects in the interior region of the module. High purity oxygen product gas 227 flows from opening 221. Typically, the pressure of oxygen-containing gases 223 and 225 is higher than the pressure of the high purity oxygen in the interior region of the module.

Figure 3B:
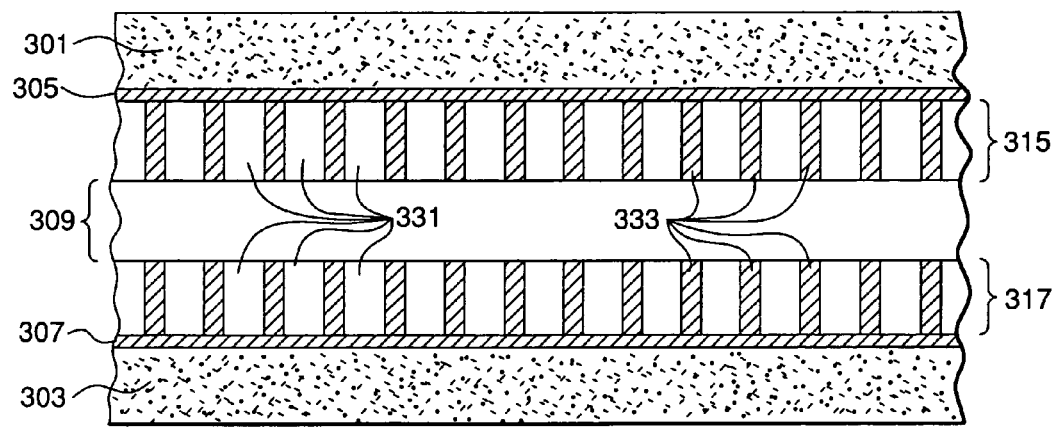
FIG. 3B is another sectional view of the membrane wafer of FIGS. 1, 2A, and 2B.

One possible exemplary configuration of the interior regions of the wafers in FIGS. 1, 2A, and 2B is illustrated in the sectional views of FIGS. 3A and 3B. Referring to FIG. 3A, which represents section 2-2 of FIG. 1, the wafer has outer support layers 301 and 303 of porous ceramic material that allows gas flow through the pores. Dense active membrane layers of 305 and 307 are in contact with outer support layers 301 and 303 and are supported by supporting ribs 321 and 329 which are part of flow channel layers 315 and 317. These ribs are in turn supported by slotted support layer 309 that has openings or slots 313 for gas flow. Open channels 319 and 325 are in flow communication via openings or slots 313. Optionally, support layers 301 and 303 may not be required when the module of FIG. 2B is used for recovering oxygen from an oxygen-containing gas.

The term "dense" refers to a ceramic material through which, when sintered or fired, a gas cannot flow. Gas cannot flow through dense ceramic membranes made of mixed-conducting multi-component metal oxide material as long as the membranes are intact and have no cracks, holes, or imperfections which allow gas leaks. Oxygen ions can permeate dense ceramic membranes made of mixed-conducting multi-component metal oxide material at elevated temperatures, typically greater than 600° C.

FIG. 3B, which represents section 4-4 of FIGS. 2A and 2B, illustrates a wafer section rotated 90 degrees from the section of FIG. 3A. This section shows identical views of outer support layers 301 and 303 and of dense active membrane material layers 305 and 307. This section also shows alternate views of slotted support layer 309 and flow channel layers 315 and 317. Open channels 331 are formed between alternating supporting ribs 333 and allow gas flow through the interior region of the wafer. The interior region of the wafer is therefore defined as the combined open volume within flow channel layer 315, flow channel layer 317, and slotted support layer 309.

The dense active membrane layers 305 and 307 preferably comprise a mixed metal oxide ceramic material containing at least one mixed-conducting multi-component metal oxide compound having the general formula $(La_xCa_{1-x})_y FeO_{3-\delta}$ wherein $1.0>x>0.5$, $1.1 \geq y>1.0$, and $\delta$ is a number which renders the composition of matter charge neutral. Any appropriate material can be used for porous support layers 301 and 303, and this material may be, for example, a ceramic material having the same composition as that of active membrane layers 305 and 307. Preferably, porous support layers 301 and 303 are mixed-conducting multi-component metal oxide material. Any appropriate material can be used for the structural members of slotted support layer 309 and flow channel layers 315 and 317, and this material may be, for example, a ceramic material having the same composition as that of active membrane layers 305 and 307. The material of channeled support layer preferably is a dense ceramic material. In one embodiment, active membrane layers 305 and 307, porous support layers 301 and 303, slotted support layer 309, and flow channel layers 315 and 317 all may be fabricated of material having the same composition.

Dense active membrane layers 305 and 307 optionally may include one or more oxygen reduction catalysts on the oxidant side. The catalyst or catalysts may comprise metals selected from or compounds containing metals selected from the group consisting of platinum, palladium, ruthenium, gold, silver, bismuth, barium, vanadium, molybdenum, cerium, praseodymium, cobalt, rhodium and manganese.

Porous support layers 301 and 303 optionally may include one or more catalysts to promote hydrocarbon oxidation, reforming, and/or other reactions that occur in the porous layer. The catalyst or catalysts may be disposed on either or both surfaces of porous support layers 301 and 303, or alternatively may be dispersed throughout the layer. The one or more catalysts may comprise metals selected from or compounds containing metals selected from the group consisting of platinum, palladium, rhodium, ruthenium, iridium, gold, nickel, cobalt, copper, potassium and mixtures thereof. If desired for structural and/or process reasons, an additional porous layer may be disposed between active membrane layers 305 and 307 and the adjacent flow channel layers 315 and 317 respectively.

Figure 3C:
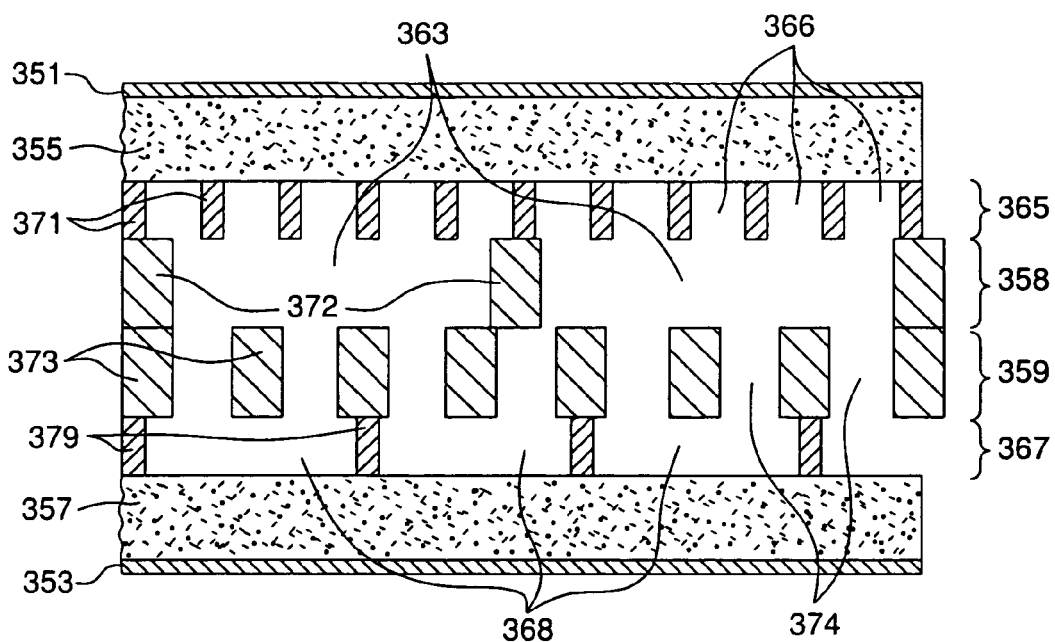
FIG. 3C is a sectional view of an alternative membrane wafer of FIGS. 1, 2A, and 2B.
Figure 3D:
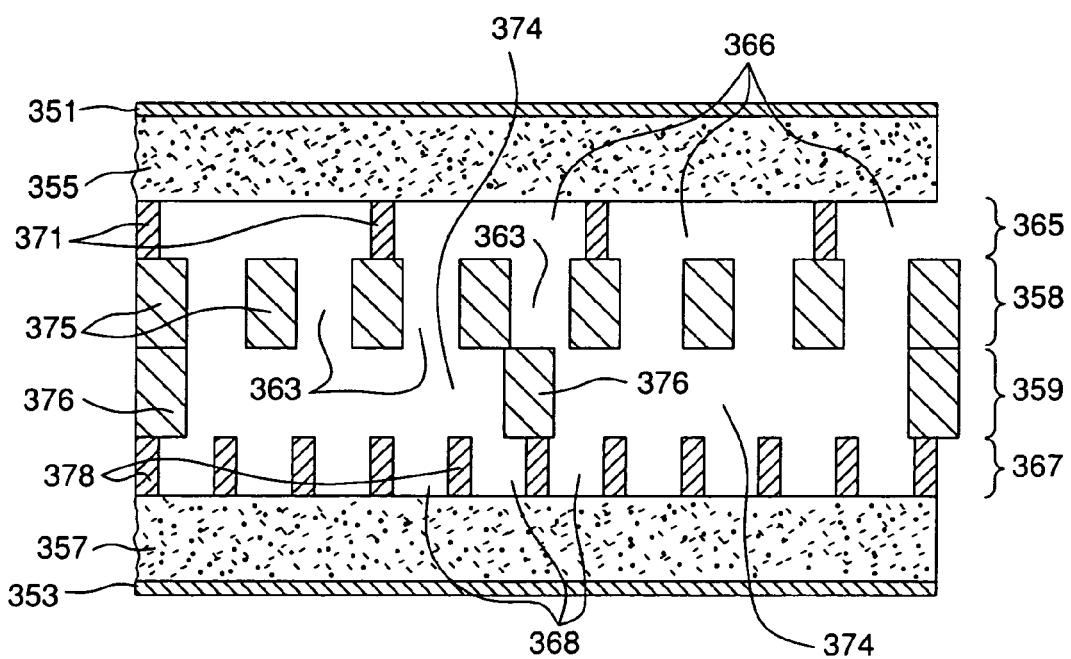
FIG. 3D is another sectional view of the alternative membrane wafer of FIGS. 1, 2A, and 2B.

Another possible configuration of the interior regions of the wafers for the oxygen recovery application in FIGS. 1, 2A, and 2B are illustrated in the sectional views of FIGS. 3C and 3D. Referring to FIG. 3C, which represents section 2-2 of FIG. 1, the wafer has outer dense layers 351 and 353. Porous ceramic layers of 355 and 357 are in contact with outer dense layers 351 and 353. Porous ceramic layer 355 is supported by supporting ribs 371, which are part of flow channel layer 365. Porous ceramic layer 355 is in contact with flow channels 366, which are part of flow channel layer 365. Porous ceramic layer 357 is in contact with flow channels 368, which are part of flow channel layer 367.

Ribs 371 are supported in turn by flow channel layer 358 that has openings or slots 363 for gas flow. Flow channel layer 367 is supported by ribs 373 of flow channel layer 359, and bridges 379 form the ends of flow channels 368. Bridges 372 form the ends of the flow channels 363 and flow channels 368 are in flow communication with flow channels 374 of flow channel layer 359. Open channels 374 and 363 are in flow communication.

FIG. 3D, which represents section 4-4 of FIGS. 2A and 2B, illustrates a section of the wafers rotated 90 degrees from the section of FIG. 3C. This section shows identical views of outer dense layers 351 and 353 and of porous ceramic layers 355 and 357. Porous ceramic layer 355 is supported by flow channel layer 365. Porous ceramic layer 355 is in contact with flow channels 366, which are part of flow channel layer 365. Porous ceramic layer 357 is supported by ribs 378 of flow channel layer 367. Porous layer 357 is in flow communication with flow channels 368, which are part of flow channel layer 367.

Ribs 378 are supported in turn by flow channel layer 359 that has openings or slots 374 for gas flow. Flow channel layer 365 is supported by ribs 375 of flow channel layer 358. Bridges 371 form the ends of flow channels 366. Bridges 376 form the ends of the flow channels 374 and flow channels 366 are in flow communication with flow channels 363 of flow channel layer 358. Open channels 374 and 363 are in flow communication.

The interior region of the wafer therefore is defined as the combined open volume within flow channel layer 365, flow channel layer 367, flow channel layer 358 and flow channel layer 359. The flow channels in layers 365 and 358 may be orthogonal to each other, as may be the flow channels in layers 367 and 359. Alternatively, flow channels 358 and 359 may be replaced by a single flow channel layer that comprises flow channels that radiate from the center of the wafer and are in flow communication with a central port in the center of the wafer.

Exemplary compositions for the dense active membrane are described in U.S. Pat. No. 6,056,807, which is incorporated herein by reference. Dense active membrane layers 351 and 353 preferably comprise a mixed metal oxide ceramic material containing at least one mixed-conducting multi-component metal oxide compound having the general formula $(La_xSr_{1-x})Co_yO_{3-\delta}$ wherein $1.0<x<0.4$, $1.02 \geq y > 1.0$, and $\delta$ is a number which renders the composition of matter charge neutral. Any appropriate ceramic material can be used for porous support layers 355 and 357, and may be, for example, material of the same composition as that of active membrane layers 351 and 353. Preferably, porous support layers 355 and 357 are mixed-conducting multi-component metal oxide material. Any appropriate material can be used for the structural members of flow channel layers 365, 367, 358 and 359, and this material may be, for example, a ceramic material having the same composition as that of active membrane layers 351 and 353. The material of channeled flow layers preferably is a dense ceramic material. In one embodiment, active membrane layers 351 and 353, porous support layer 355 and 357, and channeled flow layers 358, 359, 365 and 367 all may be fabricated of material having the same composition.

Optionally, a porous layer may be applied on the outside surface of dense layers 351 and 353. Other exemplary configurations for the interior regions of the wafers for the oxygen generation application are given in U.S. Pat. No. 5,681,373, which is incorporated herein by reference.

Figure 4A:
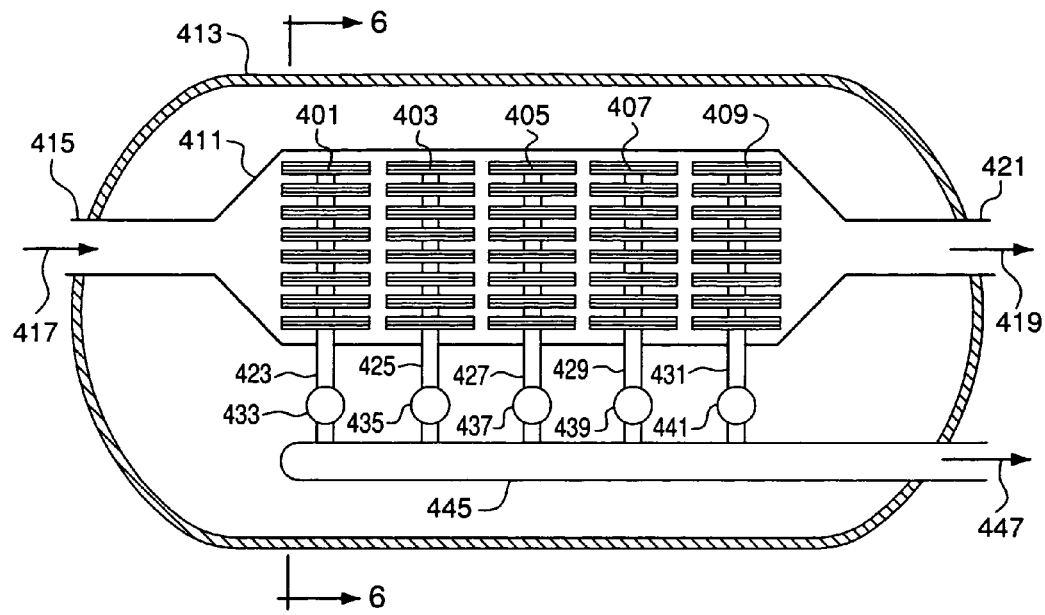
FIG. 4A is a schematic side view of the interior of a membrane separator vessel for use in oxygen recovery.

Embodiments of the present invention utilize multiple membrane modules arranged in series as defined above. The series modules in turn may be installed in one or more vessels with appropriate gas flow containment ducts, conduits, and/or manifolds to direct gas streams to and from the modules. One of these embodiments is illustrated in FIG. 4A, which is a schematic side view of the interior of an exemplary membrane separator vessel for use in recovering high purity oxygen from an oxygen-containing gas. Membrane modules 401, 403, 405, 407, and 409 are installed in series in optional flow containment duct 411 within pressure vessel 413. These membrane modules may be, for example, similar to the module described above with reference to FIGS. 1 and 2B. Optional flow containment duct 411 has inlet 415 to direct inlet gas stream 417 through the duct to contact the outer surfaces of the wafers in modules 401 to 409. The inlet gas stream is a pressurized oxygen-containing oxidant gas, for example air, that has been heated by any appropriate method (not shown) to a temperature of 600° C. to 1100° C. The pressure of the gas within duct 411 may be in the range of 0.2 to 8 MPa. The flow containment duct preferably comprises an oxidation-resistant metal alloy containing iron and one or more elements selected from the group consisting of nickel and chromium. Commercially-available alloys that may be used for flow containment ducts include Haynes® 230, Incolloy 800H, Haynes® 214, and Inconel® 693 alloys.

The gas pressure in the interior of flow containment duct 411 preferably is greater than the gas pressure in the interior of pressure vessel 413 between the inner wall of the vessel and the outer wall of flow containment duct 411. The pressure differential between the interior and the exterior of duct 411 at any point between the inlet and outlet of pressure vessel 413 preferably is maintained at a value equal to or greater than zero, wherein the pressure in the interior of the duct is equal to or greater than the pressure in the pressure vessel exterior to the duct. This may be accomplished, for example, by purging the space outside the duct with a gas at lower pressure than the process gas inside the duct; allowing flow communication between the space outside the duct and the process gas in the duct at process gas outlet 421; introducing a purge gas into the space outside the duct, or withdrawing the purge gas through a purge gas outlet while using pressure controllers on a purge gas outlet to maintain a lower pressure in the space outside the duct than inside the duct.

As the oxygen-containing gas passes in series over the surfaces of the wafers in membrane modules 401 to 409, oxygen permeates the dense active membrane layers and collects in the interior regions of the modules. Oxygen-depleted gas stream 419 exits the duct and pressure vessel via outlet 421. High purity oxygen permeate product from the interior regions of the modules flows via primary manifolds 423, 425, 427, 429, and 431, secondary manifolds 433, 435, 437, 439, and 441, and main manifold 445, and exits the system as high purity gas product stream 447. At least two of membrane modules 401 to 409 define a module axis which may be parallel to or coincident with the axis of pressure vessel 413 or with the axis of flow containment duct 411.

While the exemplary membrane separator vessel described above has a single inlet for feed gas to the membrane modules, a single flow containment duct, and a single outlet from the membrane modules, other embodiments are possible in which multiple inlets, multiple flow containment ducts, and/or multiple outlets may be used. For example, a pressure vessel may have two (or more) flow containment ducts, each having one or more inlets and one or more outlets. Generically, when a separator vessel is described as having an inlet and an outlet, this means that it has one or more inlets and one or more outlets. Generically, when a separator vessel is described as having a flow containment duct, this means that it has one or more flow containment ducts.

Figure 4B:
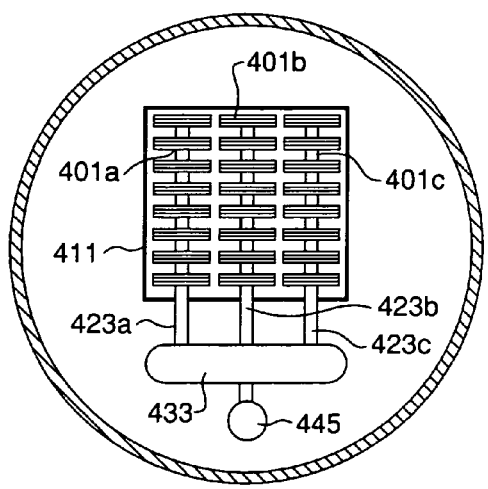
FIG. 4B is a cross sectional view of FIG. 4A.

Another view of the exemplary membrane separator vessel of FIG. 4A is given by section 6-6 as shown in FIG. 4B. In this embodiment, a bank of three membrane modules 401a, 401b, and 401c is installed in parallel in duct 411 and has three primary manifolds 423a, 423b, and 423c that are connected to secondary manifold 433. Secondary manifold 433 is connected in turn to main manifold 445. Alternatively, one membrane module, two parallel membrane modules, or more than three parallel membrane modules may be used in each bank.

While secondary manifolds 433, 435, 437, 439, and 441, and main manifold 445 are located in the interior of pressure vessel 413 in the embodiments of FIGS. 4A and 4B, these manifolds may be located outside of the pressure vessel in an alternative embodiment. Primary manifolds 423, 425, 427, 429, and 431 would pass through the wall of pressure vessel 413 in this alternative embodiment.

In an alternative embodiment, planar membrane modules 401 through 409 may be replaced by tubular membrane modules placed in series relationship relative to the longitudinal flow of gas through optional duct 411. These modules may utilize multiple single tubes or may utilize bayonet-type tubes, and the modules may be oriented such that gas flows across the tubes in crossflow or contacts the tubes in parallel flow. In this alternative embodiment, all manifolds are located inside the pressure vessel as shown in FIGS. 4A and 4B.

Figure 5:
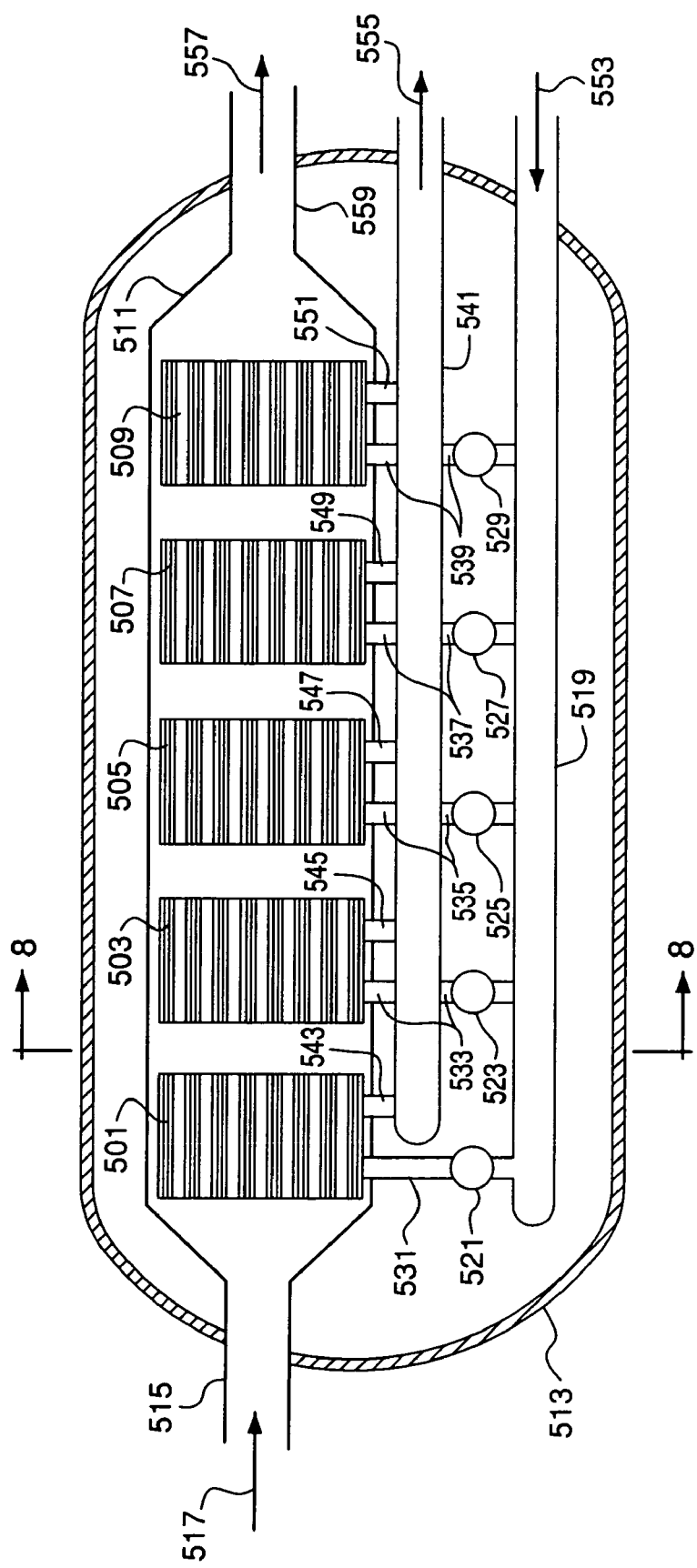
FIG. 5 is a schematic side view of the interior of a membrane reactor vessel for use in oxidation processes.

Another embodiment of the invention is illustrated in FIG. 5, which is a schematic side view of the interior of an exemplary membrane reactor vessel for use in oxidation processes. Membrane modules 501, 503, 505, 507, and 509 are installed in series in flow containment duct 511 within pressure vessel 513. These membrane modules may be, for example, similar to the module described above with reference to FIGS. 1 and 2A. Optional flow containment duct 511 has inlet 515 to direct inlet gas stream 517 through the duct to contact the outer surfaces of the wafers in modules 501 to 509. The inlet gas stream is a reactant feed gas containing one or more components which react with oxygen at elevated temperatures wherein the inlet reactant feed gas is heated by any appropriate method (not shown) to a temperature of 600° C. to 1100° C. The pressure of the gas within duct 511 may be in the range of 0.2 to 8 MPa. An example of a reactant feed gas is a mixture of steam and natural gas wherein the natural gas comprises mostly methane with smaller amounts of light hydrocarbons. The mixture may be preformed at a temperature below about 800° C. to yield a reactant feed gas containing steam, methane, and carbon oxides. Other oxidizable reactant feed gases may include, for example, various mixtures of hydrogen, carbon monoxide, steam, methanol, ethanol, and light hydrocarbons.

The gas pressure in the interior of flow containment duct 511 preferably is greater than the gas pressure in the interior of pressure vessel 513 between the inner wall of the vessel and the outer wall of flow containment duct 511. The pressure differential between the interior and the exterior of duct 511 at any point between the inlet and outlet of pressure vessel 513 preferably is maintained at a value equal to or greater than zero, wherein the pressure in the interior of the duct is equal to or greater than the pressure in the pressure vessel exterior to the duct. This may be accomplished, for example, by purging the space outside the duct with a gas at lower pressure than the process gas inside the duct; allowing flow communication between the space outside the duct and the process gas in the duct at the process gas outlet, 559; introducing a purge gas into the space outside the duct, and withdrawing the purge gas through a purge gas outlet while using pressure controllers on a purge gas outlet to maintain a lower pressure in the space outside the duct than inside the duct.

The interior regions of membrane modules 501 to 509 are in flow communication with two manifold systems, one to introduce an oxygen-containing oxidant gas into the modules and the other to withdraw oxygen-depleted oxidant gas from the modules. The first of these manifold systems comprises main inlet manifold 519, primary inlet manifolds 521, 523, 525, 527, and 529, and secondary inlet manifolds 531, 533, 535, 537, and 539. The second of these manifold systems comprises main outlet manifold 541 and primary outlet manifolds 543, 545, 547, 549, and 551.

In an alternative configuration (not shown) to the configuration of FIG. 5, secondary inlet manifolds 531, 533, 535, 537, and 539 may be combined with primary outlet manifolds 543, 545, 547, 549, and 551, respectively, when located within flow containment duct 511. Two manifolds may be combined by installing a first or inner conduit within a second or outer conduit wherein the first conduit provides a first manifold and the annulus between the conduits provides a second manifold. The conduits may be concentric or coaxial; alternatively, the conduits may not be concentric or coaxial and may have separate parallel or nonparallel axes. This configuration of inner and outer conduits to provide a combined manifold function is defined herein as a nested manifold.

In this alternative configuration, gas 553 would flow through the central conduit and gas 555 would flow through the annulus of each set of these nested manifolds. The nested manifolds would transition to separate manifolds exterior to flow containment duct 511, i.e., would transition to secondary inlet manifolds 531, 533, 535, and 539 and primary outlet manifolds 543, 545, 547, 549, and 551 as shown in FIG. 5. Optionally, primary outlet manifolds 543, 545, 547, 549, and 551 may be nested within secondary inlet manifolds 531, 533, 535, 537, and 539, respectively, within flow containment duct 511. In this option, gas 555 would flow through the central conduit and gas 553 would flow through the annulus of each set of these nested manifolds. In generic terms, therefore, the secondary inlet manifolds and the primary outlet manifolds may be nested when located within flow containment duct 511, and either a secondary inlet manifold or a primary outlet manifold may be provided by the annulus Heated, pressurized oxygen-containing oxidant gas 553, for example, air that has been heated by any appropriate method (not shown) to a temperature of 600 to 1100° C., enters main inlet manifold 519 and flows via primary inlet manifolds 521, 523, 525, 527, and 529 and secondary inlet manifolds 531, 533, 535, 537, and 539 to the inlets of membrane modules 501, 503, 505, 507, and 509. Oxygen from the oxidant gas in the interior regions of the membrane modules permeates the dense active membrane layers in the wafers of modules 501 to 509 and the permeated oxygen reacts with the reactive components in the exterior regions of the membrane modules. Oxygen-depleted oxidant gas exits the outlets of the interior regions of the membrane modules via primary outlet manifolds 543, 545, 547, 549, and 551 and main outlet manifold 541, and the final oxygen-depleted oxidant gas is withdrawn as gas stream 555. Outlet gas stream 557, which contains reaction products and unreacted feed components, is withdrawn from the reactor system via outlet 559.

While the exemplary reactor vessel described above has a single inlet for reactant feed gas to the membrane modules, a single flow containment duct, and a single outlet from the membrane modules, other embodiments are possible in which multiple inlets, multiple flow containment ducts, and/or multiple outlets may be used. For example, a pressure vessel may have two or more flow containment ducts, each having one or more inlets and one or more outlets. Generically, when a reactor vessel is described as having an inlet and an outlet, this means that it has one or more inlets and one or more outlets. Generically, when a reactor vessel is described as having a flow containment duct, this means that it has one or more flow containment ducts.

Figure 6:
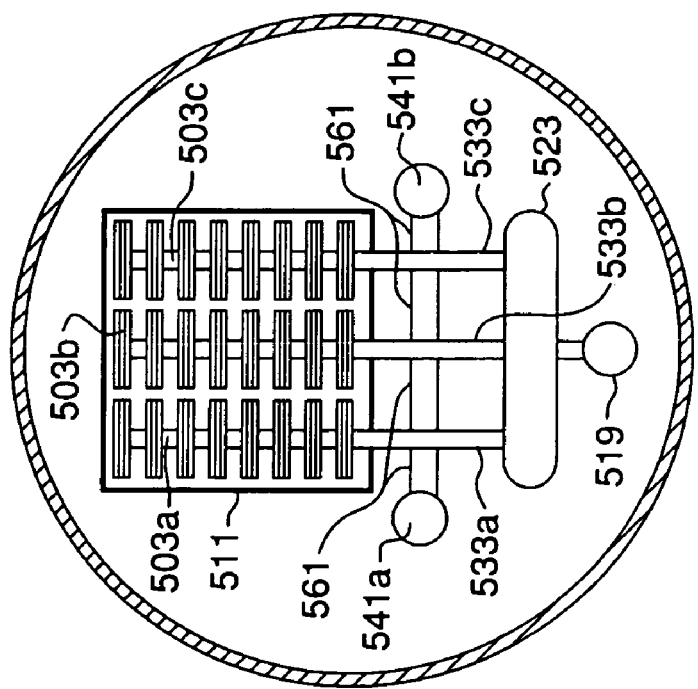
FIG. 6 is a cross sectional view of FIG. 5.

Another view of the exemplary membrane reactor vessel of FIG. 5 is given in section 8-8 as shown in FIG. 6. In this embodiment, a bank of three membrane modules 503a, 503b, and 503c are installed in parallel in duct 511. Oxidant gas flows through main inlet manifold 519, primary inlet manifold 523, and secondary inlet manifolds 533a, 533b, and 533c to the inlets of membrane modules 503a, 503b, and 503c. Oxygen-depleted oxidant gas exits membrane modules 503a, 503b, and 503c via primary outlet manifolds 545a, 545b, and 545c (located behind secondary inlet manifolds 533a, 533b, and 533c), secondary outlet manifold 561, and main outlet manifolds 541a and 541b. While three parallel membrane modules are shown in the embodiment of FIG. 6, one membrane module, two parallel membrane modules, or more than three parallel membrane modules may be used as desired.

A guard bed (not shown) may be installed in inlet 415 of pressure vessel 413 and/or in inlet 515 to pressure vessel 513 to remove trace contaminants from inlet stream 417 and/or 517. Alternatively, the guard bed may be installed in the interior of the pressure vessel between the inlet and the first membrane module. The contaminants may include, for example, sulfur-, chromium- and/or silicon-containing gaseous species. The guard bed may contain one or more materials selected from the group consisting of magnesium oxide, calcium oxide, copper oxide, calcium carbonate, sodium carbonate, strontium carbonate, strontium oxide, zinc oxide, and alkaline-earth-containing perovskites. These materials react with and remove the contaminants from the inlet stream of reactant gas or oxygen-containing gas.

Additional pressure vessels may be installed in series with pressure vessel 413 such that the outlet gas from one vessel feeds the other vessel. Additional pressure vessels may be placed in parallel wherein a plurality of pressure vessels operate in parallel and in series. Likewise, additional pressure vessels may be installed in series with pressure vessel 513 such that the outlet gas from one vessel feeds the other vessel. Additional pressure vessels may be placed in parallel wherein a plurality of pressure vessels operate in parallel and in series. Guard beds may be placed between any series pressure vessels as desired.

In the embodiments described above, it is desirable to use internal insulation to maintain the walls of pressure vessel 413 and 513 at temperatures lower than the temperatures of the respective membrane modules 401 to 409 and 501 to 509. This may be accomplished by various insulation alternatives in FIGS. 7 through 13, which illustrate insulation configurations for the embodiment of FIGS. 4A and 4B used for the recovery of oxygen from an oxygen-containing gas. Similar insulation configurations (not shown) may be used for the oxidation reactor embodiment of FIGS. 5 and 6.

Figure 7:
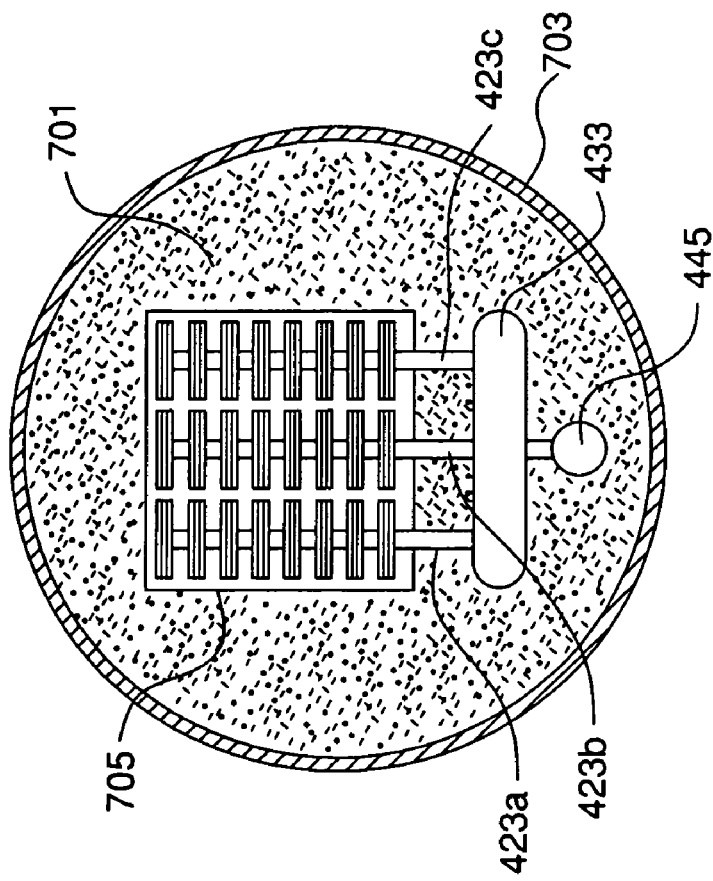
FIG. 7 is an embodiment of FIG. 4B showing the placement of insulation material.

The first of these alternatives is shown in FIG. 7 wherein insulation 701 is disposed within and may be in contact with the interior walls of pressure vessel 703. In this embodiment, a flow containment duct is not used; instead, cavity 705 is formed by the insulation itself and this cavity serves to direct gas flow over the exterior regions of the membrane modules. The insulation may be in contact with primary manifolds 423a, 423b, and 423c, secondary manifold 433, and main manifold 445.

Figure 8:
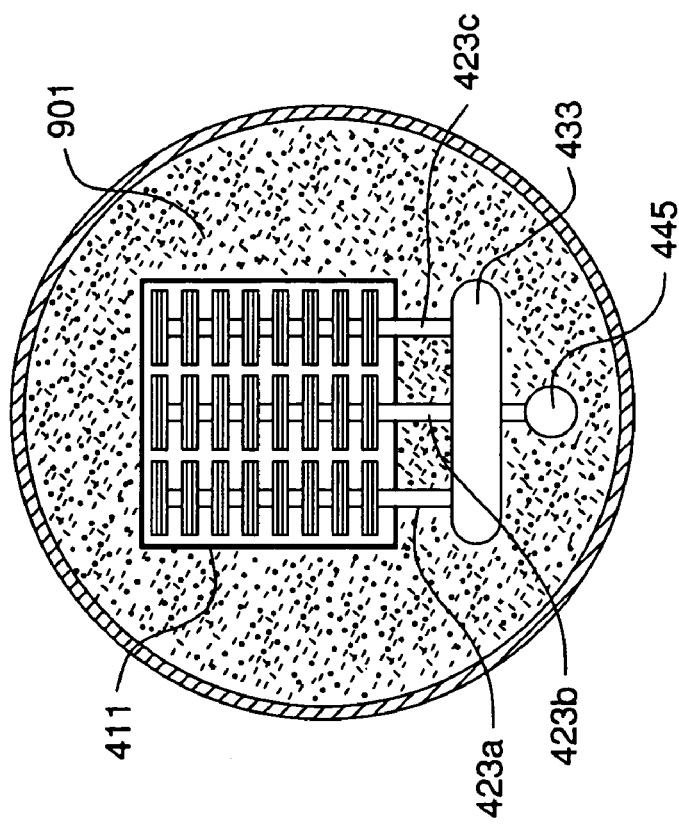
FIG. 8 is a second embodiment of FIG. 4B showing an alternative placement of thermal insulation material.

A second insulation configuration is shown in FIG. 8 wherein insulation 801 is disposed adjacent to and may be in contact with the inner wall of pressure vessel 413. In this embodiment, flow containment duct 411 is used and preferably is not in contact with insulation 801. The insulation preferably is not in contact with primary manifolds 423a, 423b, and 423c, secondary manifold 433, and main manifold 445.

Figure 9:
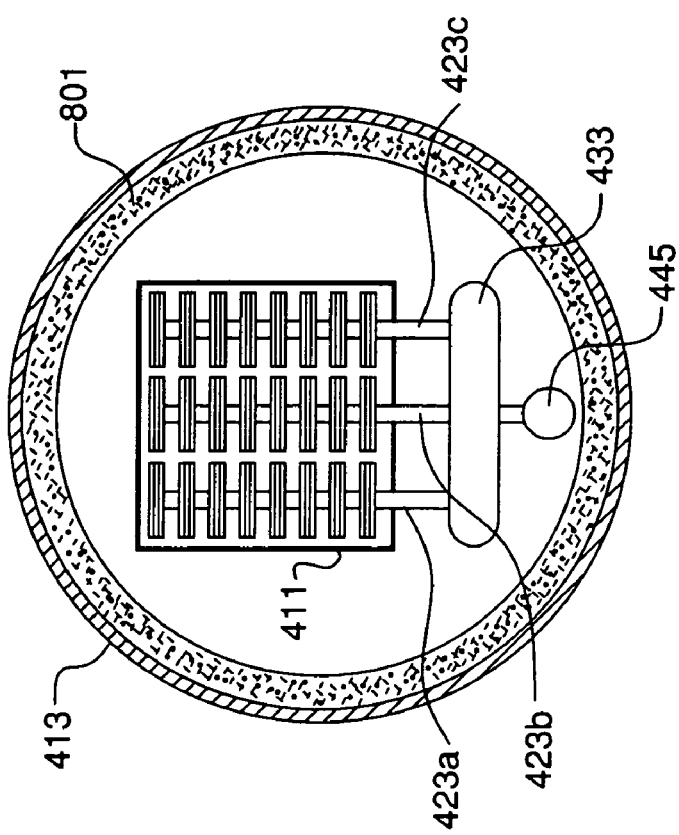
FIG. 9 is a third embodiment of FIG. 4B showing an alternative placement of thermal insulation material.

A third insulation configuration is shown in FIG. 9 wherein insulation 901 completely fills the interior region of the pressure vessel between the inner walls of the vessel and the exterior surfaces of flow containment duct 411, primary manifolds 423a, 423b, and 423c, secondary manifold 433, and main manifold 445. The insulation may be in contact with the inner vessel walls and the exterior surfaces of flow containment duct 411, primary manifolds 423a, 423b, and 423c, secondary manifold 433, and main manifold 445.

Figure 10:
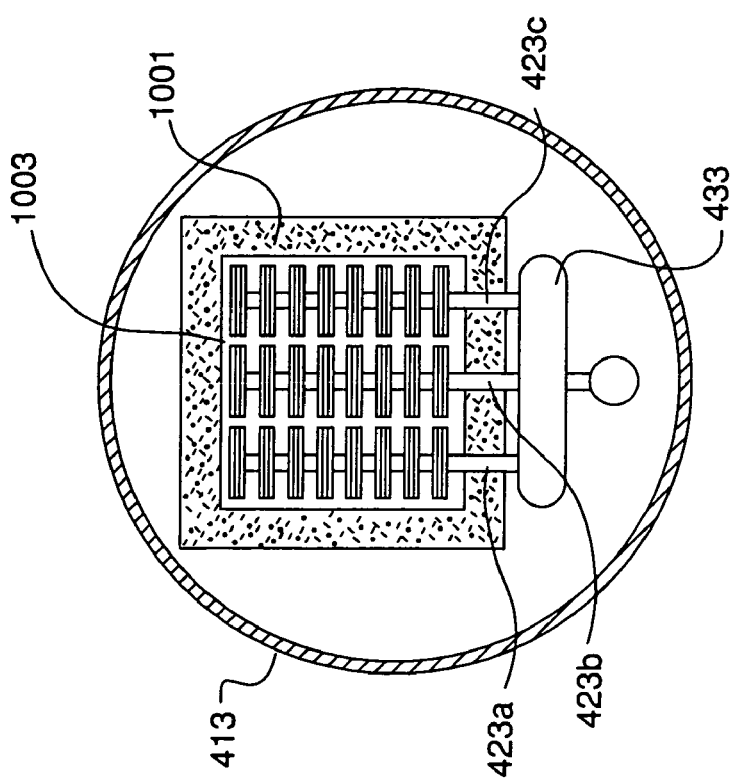
FIG. 10 is a fourth embodiment of FIG. 4B showing an alternative placement of thermal insulation material.

Another alternative insulation configuration is shown in FIG. 10 wherein insulation 1001 forms a cavity 1003 around the membrane modules and this cavity serves to direct gas flow over the exterior regions of the modules. Insulation 1001 may be in contact with primary manifolds 423a, 423b, and 423c, and typically is not in contact with the inner walls of pressure vessel 413.

Figure 11:
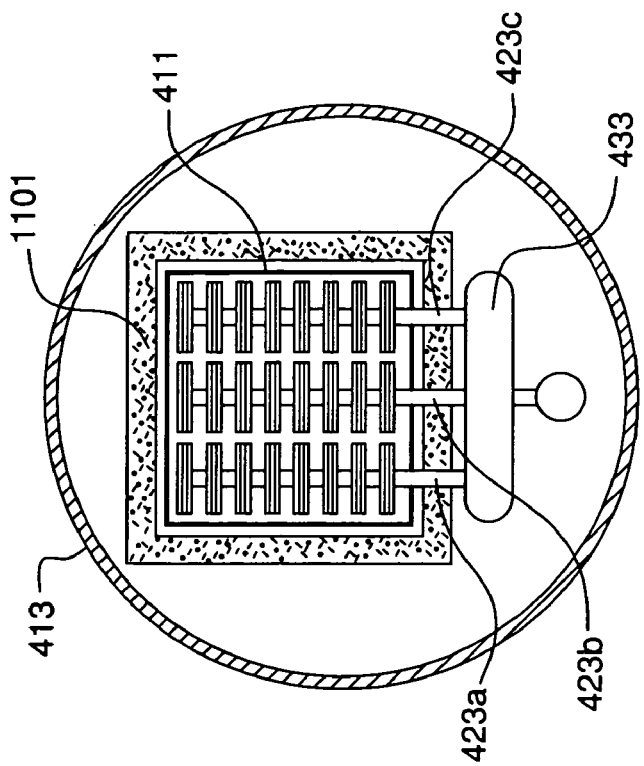
FIG. 11 is a fifth embodiment of FIG. 4B showing an alternative placement of thermal insulation material.

FIG. 11 shows another alternative insulation configuration in which insulation 1101 surrounds flow containment duct 411, which in turn surrounds the membrane modules as described above. Insulation 1101 may be in contact with primary manifolds 423a, 423b, and 423c, and typically is not in contact with the inner walls of pressure vessel 413 and the outer surface of flow containment duct 411.

Figure 12:
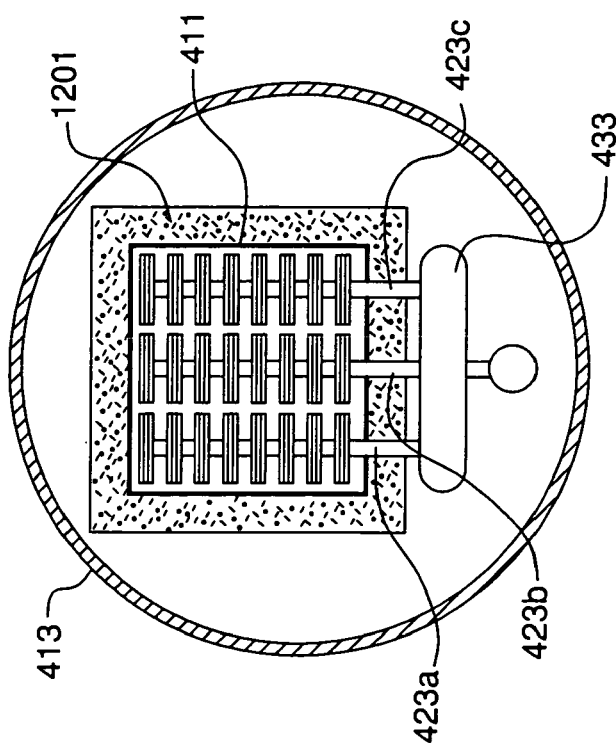
FIG. 12 is a sixth embodiment of FIG. 4B showing an alternative placement of thermal insulation material.

Another insulation configuration is shown in FIG. 12 wherein insulation 1201 surrounds flow containment duct 411, which in turn surrounds the membrane modules as described above. Insulation 1201 may be in contact with primary manifolds 423a, 423b, and 423c, typically is in contact with the outer surface of flow containment duct 411, and typically is not in contact with the inner walls of pressure vessel 413.

Figure 13:
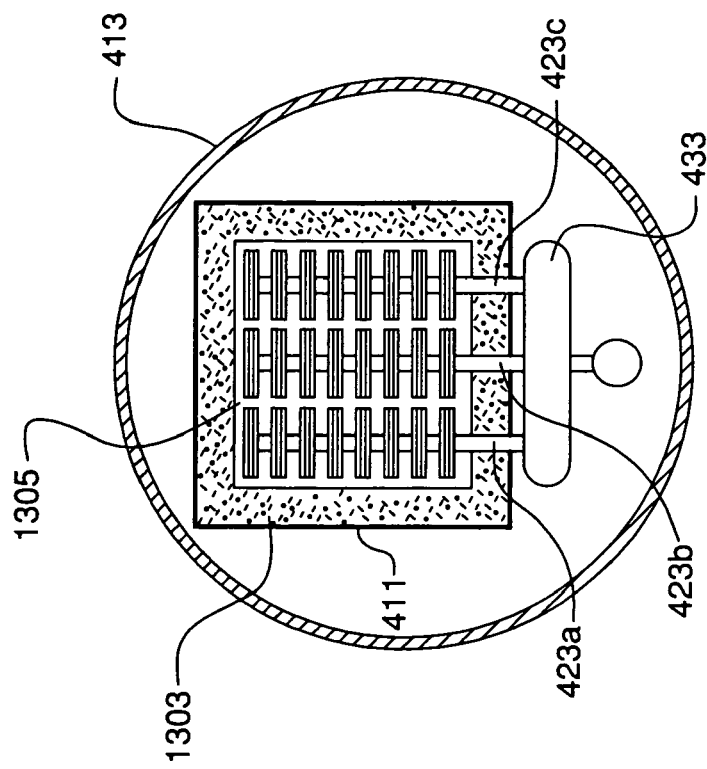
FIG. 13 is a seventh embodiment of FIG. 4B showing the placement of insulation thermal material.

A final insulation configuration is shown in FIG. 13 wherein insulation 1303 is placed within and typically in contact with the inner walls of flow containment duct 411, wherein the insulation forms a cavity 1305 around the membrane modules and this cavity serves to direct gas flow over the exterior regions of the modules. Insulation 1303 may be in contact with primary manifolds 423a, 423b, and 423c.

In any of the embodiments described above of FIGS. 7-13, a metal-to-ceramic seal typically is used in primary manifolds 423a, 423b, and 423c to transition from metal manifolds to the ceramic modules. Likewise, in the oxidation reactor embodiment of FIG. 6 and corresponding insulation embodiments similar to those of FIGS. 7-13, a metal-to-ceramic seal typically is used in primary manifolds 533a, 533b, and 533c to transition from metal manifolds to the ceramic modules. In the embodiments of FIGS. 10-13 (and similar embodiments for the oxidation reactor), these seals preferably are located within insulation 1001, 1101, 1201, and 1303 (in contact with manifolds 423a, 423b, and 423c but not with manifold 433) to obtain desired seal operating temperatures.

In any of the embodiments of FIGS. 7-13, additional insulation (not shown) may be placed around the external surface of the pressure vessel, for example to protect operating personnel from a potentially hot vessel surface. This additional insulation also may serve to ensure that the vessel interior is above the dew point of any gas within the vessel. In any of the embodiments of FIGS. 10-13, additional insulation (not shown) may be placed adjacent to the inner surface of the pressure vessel. In any of the embodiments of FIGS. 4A, 4B, and 5-13, any of the manifolds may be insulated internally and/or externally (not shown). This insulation would serve to improve the thermal expansion uniformity of flow containment duct 411 and the manifolds.

The insulation used in the embodiments of FIGS. 7-13 may contain alumina, alumino-silicate, silica, calcium silicate, or other conventional insulation materials suitable for use at elevated temperatures. The insulation may comprise, for example, one or more materials selected from the group consisting of fibrous alumina, fibrous alumino-silicate, porous alumina, and porous alumino-silicate. In the embodiments of FIGS. 7, 10, and 13, wherein the insulation itself forms a cavity around the membrane modules, the interior walls of the cavity may be coated or covered with a material which prevents volatile components from the insulation from contacting the membrane modules. For example, the cavity may be lined with a foil made of a metal such as Haynes 214 to prevent Si-containing vapor species, which may be generated from insulation materials, and/or Cr-containing vapor species, which may be generated from metal piping materials, from contacting the membrane modules.

The insulation may include one or more additional materials selected from the group consisting of magnesium oxide, calcium oxide, copper oxide, calcium carbonate, strontium carbonate, sodium carbonate, zinc oxide, strontium oxide, and alkaline-earth-containing perovskites wherein these materials may be applied to the surface of the insulation and/or dispersed throughout the insulation. These additional materials may be used in place of or in addition to the guard bed or beds described above. These materials react with and remove contaminants that may be present in the inlet stream of reactant gas; these contaminants may include, for example, sulfur-, chromium-, silicon-, or oxygen-containing containing gaseous species.

Figure 14:
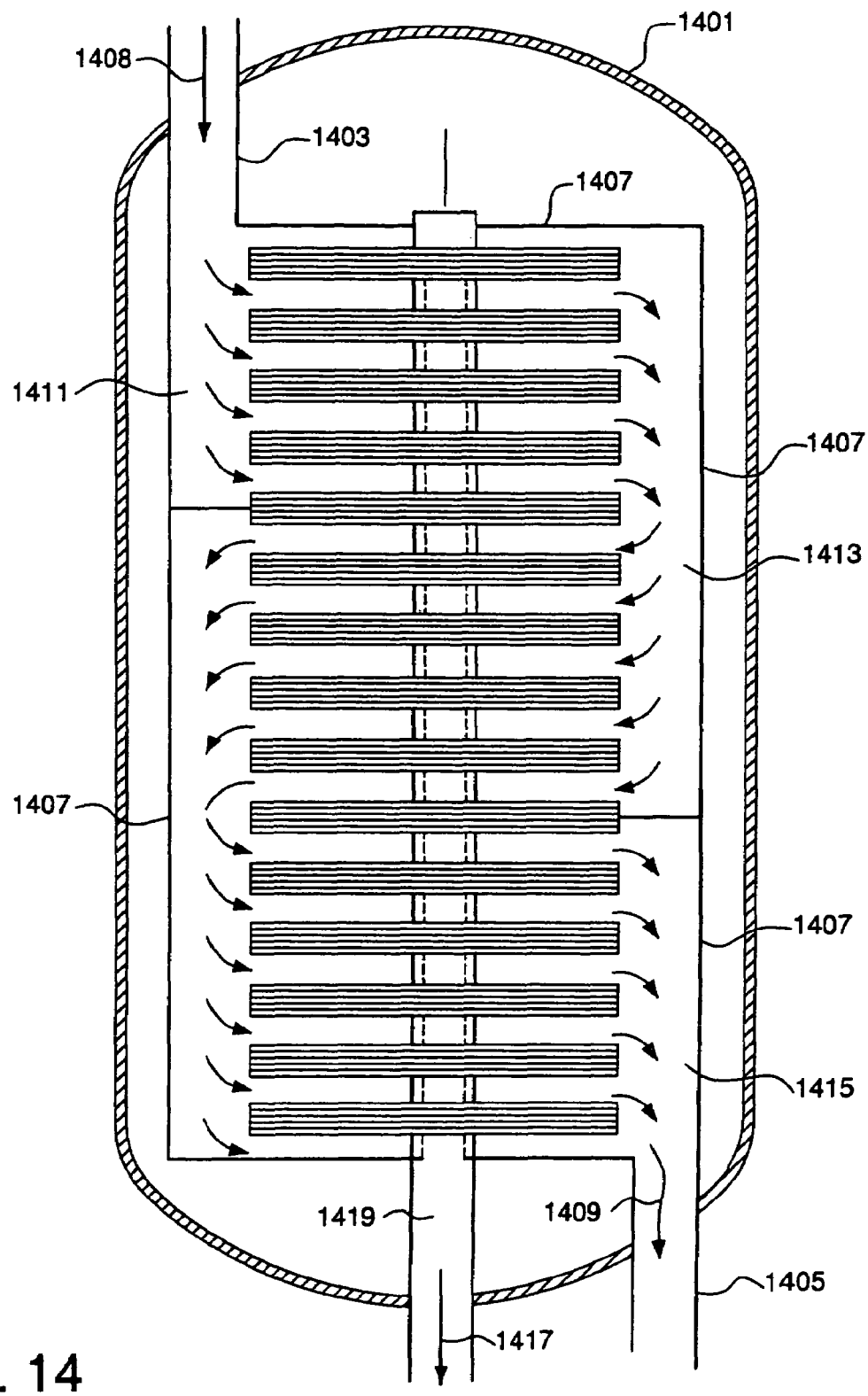
FIG. 14 is a schematic side view of the interior of an alternative membrane vessel and module arrangement for use in oxygen recovery or in oxidation processes.

An alternative embodiment for placing groups of wafers in a series flow configuration is shown in FIG. 14. In this embodiment, a tall stack is formed of wafers and spacers as described above and the stack is installed in pressure vessel 1401. Inlet line 1403 and outlet line 1405 are connected to gas manifold shroud assembly 1407 which directs the flow of inlet gas 1408 to flow in alternating directions across groups of wafers and through outlet line 1405 as outlet stream 1409. In this embodiment, the stack is divided by the shroud assembly into first wafer zone 1411, second wafer zone 1413, and third wafer zone 1415. Inlet gas 1408 thus flows in series across wafer zones 1411, 1413, and 1415 and exits via outlet line 1405. While three wafer zones are shown here for illustration purposes, any number of wafer zones can be used as required.

The embodiment of FIG. 14 may be used as an oxygen recovery device or as an oxidation reactor device. When used as an oxygen recovery device, the stack is formed of wafers and spacers as earlier described with reference to FIGS. 1 and 2B. In an oxygen recovery process, inlet gas 1408 is a heated, pressurized oxygen-containing gas (for example, air), outlet stream 1409 is an oxygen-depleted oxygen-containing gas, and stream 1417 flowing through outlet line 1419 is a high purity oxygen product stream typically at a lower pressure than the pressurized oxygen-containing gas. When used as an oxidation reactor system, the stack is formed of wafers and spacers as earlier described with reference to FIGS. 1 and 2A. In an oxidation process, inlet gas 1408 is a heated, pressurized reactant gas and outlet gas 1409 is a mixture of oxidation reaction products and unreacted reactant gas components. Stream 1417 is an oxygen-depleted oxygen-containing gas stream typically at a lower pressure than the pressurized reactant gas. Fresh oxygen-containing oxidant gas (for example, air) flows into the stack through an internal stack manifold as described with reference to FIG. 2A; the inlet to this manifold is not seen in FIG. 14 because it lies behind outlet line 1419.

The embodiment of FIG. 14 can be operated with multiple pressure vessels in series and/or in parallel as desired. Multiple modules may be installed in a single pressure vessel if desired.

Figure 15:
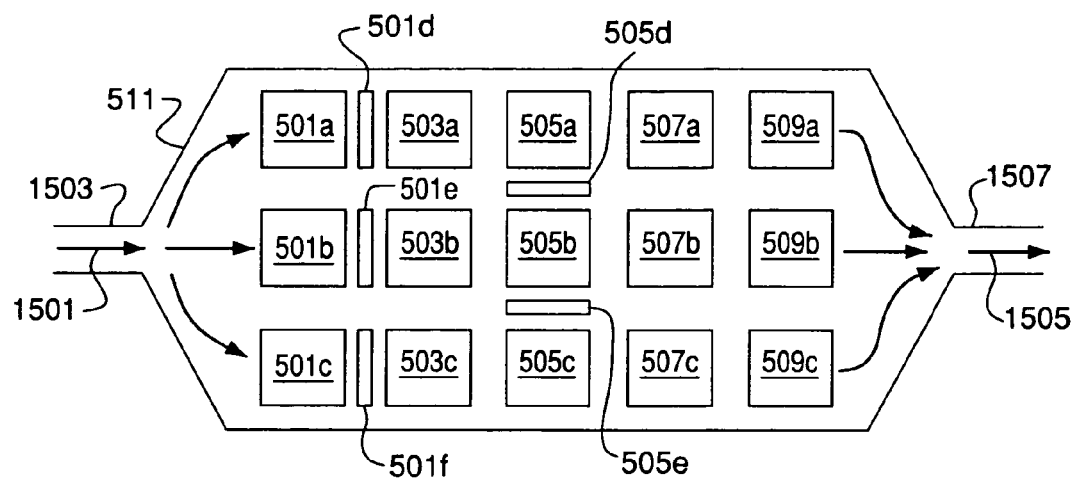
FIG. 15 is a sectional plan view of a flow containment duct in FIG. 4A having coaxial parallel membrane modules.

The series membrane modules may be arranged in banks of parallel modules as earlier described with reference to FIGS. 4A, 4B, 5, and 6. This is illustrated in FIG. 15, which is a sectional plan view (not to scale) of flow containment duct 511 and the membrane modules within the duct. In this exemplary embodiment, five banks of three parallel modules are arranged such that each individual set of series modules lies on a common module axis, i.e., modules 501a, 503a, 505a, 507a, and 509a lie on the same axis, modules 501b, 503b, 505b, 507b, and 509b lie on the same axis, and modules 501c, 503c, 505c, 507c, and 509c lie on the same axis. Thus in this example there are three axes, equal to the number of modules in each bank. Each bank comprises a plurality of modules in parallel; for example, modules 501a, 501b, and 501c constitute one bank of modules in parallel. A plurality of modules also may be arranged in series; for example, modules 501c, 503c, 505c, 507c, and 509c constitute modules in series. The definition of series modules also can include banks of modules; for example, the bank of modules 501a, 501b, and 501c is in series with the bank of modules 503a, 503b, and 503c. The module configuration in FIG. 15 thus includes modules in series and modules in parallel.

As a practical matter, it may be desirable to promote substantial radial mixing (i.e., gas flow in directions deviating from the axis of a series of modules) of gas between successive banks of modules to minimize the deleterious effect of gas bypassing around the membrane modules. The module configuration in FIG. 15 thus may be best described as including modules in parallel and banks of parallel modules operating in series. As in the design of many gas flow distribution systems, the degree of radial mixing can be maximized by proper selection of the axial and radial spacing between internal elements (i.e. membrane modules) and/or the use of flow baffles to promote gas mixing.

Inlet gas stream 1501 in inlet 1503 flows in series over each bank of radially-oriented (i.e., parallel) modules. With proper selection of the axial and radial spacing between modules, a small amount of gas may bypass modules 501a, 501b, and 501c, but eventually will contact downstream modules as it mixes or diffuses in a radial direction. Exit gas stream 1505 flows through outlet 1507. The gas flow over each successive bank of modules defines the series arrangement of this embodiment wherein all or nearly all of the gas from one bank of parallel modules contacts the next bank of parallel modules in the series of modules. Any desired number of modules may be used in parallel radially and any desired number of banks of parallel modules may be used in series axially.

Figure 16:
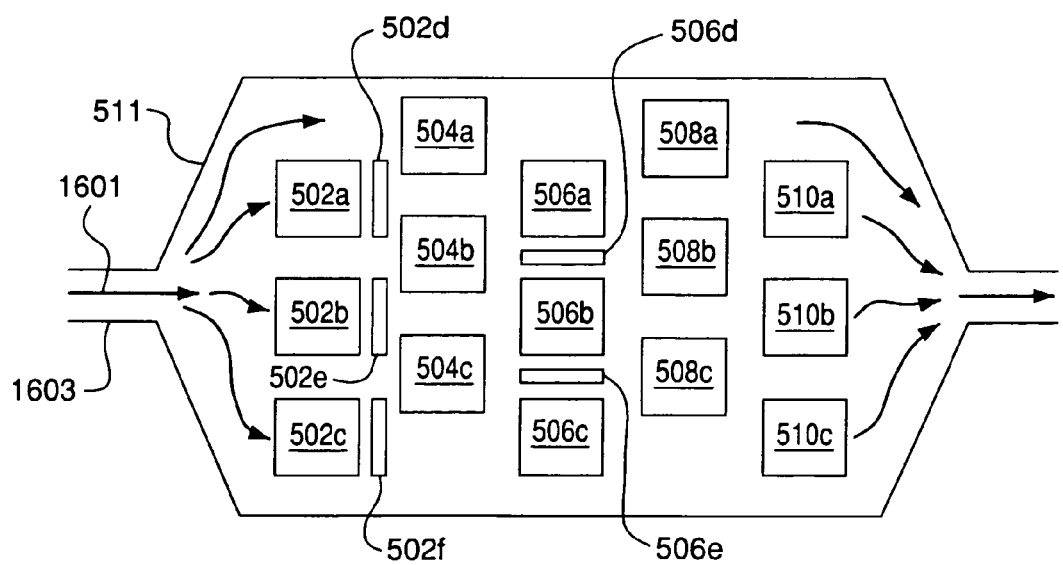
FIG. 16 is a sectional plan view of a flow containment duct with offset banks of parallel membrane modules.

In an alternative embodiment of the invention related to FIGS. 4A and 4B or to FIGS. 5 and 6, banks of parallel membrane modules may be oriented in a staggered or offset series arrangement such that a first bank of three modules is followed in series by an offset second bank of three modules which in turn is followed in series by an offset third bank of three modules, and so forth. This is illustrated in FIG. 16 wherein a first bank of three modules 502a, 502b, and 502c is followed in series by a second bank of three modules 504a, 504b, and 504c offset in a direction perpendicular to the axis of flow containment duct 511. A third bank of three modules 506a, 506b, and 506c is offset with respect to the second bank but the modules are coaxial with the modules in the first bank. This offset relationship may continue in similar fashion through the fourth bank of modules 508a, 508b, and 508c and the fifth bank of modules 510a, 510b, and 510c. Each bank may comprise a plurality of modules in parallel; for example, modules 502a, 502b, and 502c constitute one bank of modules in parallel. A plurality of modules also may be arranged in series; for example, modules 502c, 504c, 506c, 508c, and 510c may constitute modules in series. The definition of series modules also can include banks of modules; for example, the bank of modules 502a, 502b, and 502c is in series with the bank of modules 504a, 504b, and 504c. The module configuration in FIG. 16 thus includes modules in series and modules in parallel.

The modules in FIG. 16 lie on six axes, i.e., modules 502c, 506c, and 510c lie on one axis, modules 504c and 508c lie on another axis, and so forth. These axes may be parallel to the overall flow direction of gas over the modules. In this embodiment, the number of axes is greater than the number of modules in each bank of modules.

In the embodiment of FIG. 16, inlet gas stream 1601 enters through inlet 1603 and flows over modules 502a, 502b, and 502c in the first bank. A portion of this gas may bypass module 502a but, in the absence of significant radial mixing, will at least contact offset module 504a. Gas that flows between modules 502a, 502b, and 502c, will at least contact the next series of offset modules 504b and 504c. Portions of the gas that flows from module 502a in the first bank will contact at least two modules (504a and 504b) in the second bank. In this way, such an offset arrangement prevents gas from bypassing straight through a gap between rows of modules on a common axis. Instead, gas bypassing any module in a bank of modules will impinge directly on a module in the next bank of modules. In the absence of significant radial mixing, at least a portion of the gas from one or more of the modules in a bank will contact one or more of the modules in the next bank, and this defines the series arrangement of modules in this embodiment.

The definition of modules arranged in series according to the present invention thus includes both embodiments described above with reference to FIGS. 15 and 16. In these embodiments, the axes of banks of modules and the axes of series modules may be generally orthogonal, and the axes of series modules may be generally parallel to the overall direction of gas flow through the vessel. Alternative embodiments are possible wherein the axes of banks of modules are not generally orthogonal to the axes of the series modules and/or wherein the axes of series modules are not generally parallel to the overall direction of gas flow through the vessel. In these alternative embodiments, the banks of modules lie at acute angles to the overall direction of gas flow through the vessel. These alternative embodiments are included in the definition of modules arranged in series according to the present invention.

The series reactor system described above may be used in oxidation service to produce synthesis gas from a hydrocarbon-containing feed gas such as natural gas. In this application, reforming catalyst may be disposed between any series modules, any parallel modules, any series and parallel modules, and/or following the final modules in a vessel. The reforming catalyst promotes the endothermic reactions of water and/or carbon dioxide with hydrocarbons, especially methane, to generate hydrogen and carbon monoxide. The catalyst may be used to complement or balance the exothermic oxidation reactions that occur between permeated oxygen and reactants adjacent to the surfaces of the active membrane material in the modules. By appropriate use of reforming catalyst at strategic locations between the modules in a multiple-module series reactor system, the temperature profiles across the reactor and the product gas composition may be controlled to achieve optimum reactor operation.

An embodiment of the present invention is illustrated by the exemplary placement of appropriate catalyst between the modules of a multiple-module series oxidation reactor system. For example, referring to FIG. 15, catalyst 501d, 501e, and 501f may be placed in series fashion in the space between any modules in the first bank of modules 501a, 501b, and 501c and the second bank of modules 503a, 503b, and 503c. Alternatively, catalyst 501d, 501e, and 501f may extend continuously between the inner walls of flow containment duct 511. Likewise, catalyst may be placed between any or all of the second and third banks of modules, the third and fourth bank of modules, the fourth and fifth banks of modules, or following the fifth bank (not shown). Similarly, catalyst may be placed in series fashion between any or all of the offset banks of modules in the embodiment of FIG. 16. For example, referring to FIG. 16, catalyst 502d, 502e, and 502f may be placed in series fashion in the space between the first and second banks of modules. Alternatively, catalyst 502d, 502e, and 502f may extend continuously between the inner walls of flow containment duct 511. In general, catalyst may be placed in series fashion between or downstream of any or all of the series banks of modules in FIGS. 15 and 16.

Additionally or alternatively, catalyst may be placed between the modules in a bank of parallel modules to promote reforming reactions in the gas passing between the modules. For example, in FIG. 15 catalyst 505d and 505e may be placed between modules 505a and 505b and between 505b and 505c. Alternatively, catalyst 505d, and 505e may extend continuously in the axial direction between the first through fifth banks of modules. For example, in FIG. 16 catalyst 506d and 506e may be placed between modules 406a and 506b and between 506b and 506c. In general, catalyst may be placed in parallel fashion between any or all of the parallel modules in FIGS. 15 and 16.

In the broadest application of this concept, therefore, catalyst may be placed in the space between any two adjacent modules in the embodiments of FIGS. 15 and 16, or in any other embodiments with both of series and parallel module placement. In addition, when pressure vessel 513 is operated in series with another similar pressure vessel, catalyst may be placed between the vessels such that the effluent gas from one pressure vessel passes through the catalyst before passing into the second pressure vessel.

The catalyst may be varied in type and/or amount depending on the axial or radial location among the modules in the pressure vessel. In one alternative, for example, the catalyst activity may be varied in the axial direction for optimal control of the module temperatures through the reactor. For example, catalyst sections near the inlet of the reactor may comprise catalyst which is active at lower temperature (i.e. a high Ni loading), whereas in higher temperature regions of the reactor the optimal catalyst composition may involve lesser activity and greater thermal stability (i.e. a low Ni loading). In this way, optimal catalyst activity can be achieved at every axial location in the reactor, while maintaining thermal stability of the catalyst. Other catalyst arrangements are possible and fall within the scope of embodiments of the claimed invention.

The catalyst for use in this embodiment may include one or more metals or compounds containing metals selected from the group consisting of nickel, cobalt, platinum, gold, palladium, rhodium, ruthenium, and iron. The catalyst may be supported on alumina or other oxide supports and may include additions such as lanthanum or potassium. The catalyst may be placed between modules by any known means including, for example, using monoliths or using granular catalysts in appropriate catalyst holders that fit in the spaces between the modules.

The invention claimed is:

1. An ion transport membrane reactor system comprising
   (a) a pressure vessel having an interior, an exterior, an inlet, and an outlet;
   (b) a plurality of ion transport membrane modules disposed in the interior of the pressure vessel, wherein a first plurality of modules are arranged in series; and
   (c) catalyst disposed between any two membrane modules in the first plurality of modules.

2. The reactor system of claim 1 which further comprises a second plurality of modules arranged in series, wherein the first plurality of modules is arranged in parallel with the second plurality of modules.

3. The reactor system of claim 2 wherein the catalyst is disposed between any modules that are arranged in parallel, between any modules that are arranged in series, or between any modules that are arranged in parallel and between any modules that are arranged in series.

4. The reactor system of claim 3 wherein the catalyst comprises one or more metals or compounds containing metals selected from the group consisting of nickel, cobalt, platinum, gold, palladium, rhodium, ruthenium, and iron.

5. The reactor system of claim 3 wherein the catalyst is placed between a number of modules in series and the activity of the catalyst varies at different locations between the modules in series.

* * * * *